(12) United States Patent
Erdem et al.

(10) Patent No.: US 12,486,603 B2
(45) Date of Patent: Dec. 2, 2025

(54) METHODS FOR MAKING THREE-DIMENSIONAL WEBS

(71) Applicant: The Procter & Gamble Company, Cincinnati, OH (US)

(72) Inventors: Gueltekin Erdem, Cincinnati, OH (US); Mattias Schmidt, Idstein (DE); Arman Ashraf, Mason, OH (US); Han Xu, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 102 days.

(21) Appl. No.: 18/414,636

(22) Filed: Jan. 17, 2024

(65) Prior Publication Data

US 2024/0247418 A1 Jul. 25, 2024

(30) Foreign Application Priority Data

Jan. 19, 2023 (WO) ................ PCT/CN2023/079146

(51) Int. Cl.
*B26F 1/24* (2006.01)
*B29C 65/08* (2006.01)
(Continued)

(52) U.S. Cl.
CPC ............. *D04H 3/16* (2013.01); *B29C 69/001* (2013.01); *B32B 37/203* (2013.01); *D01D 7/00* (2013.01);
(Continued)

(58) Field of Classification Search
CPC ......... B26F 1/24; B29C 65/08; B29C 69/001; B29C 2793/0045; B32B 37/203;
(Continued)

(56) References Cited

U.S. PATENT DOCUMENTS 10,190,244 B2   1/2019  Ashraf
10,577,722 B2   3/2020  Ashraf et al.
(Continued)

FOREIGN PATENT DOCUMENTS

GB    2182685 A    5/1987
WO    03093554 A2  11/2003
(Continued)

OTHER PUBLICATIONS

PCT Search Report and Written Opinion for PCT/CN2023/073146 dated Jun. 23, 2023, 13 pages.
(Continued)

*Primary Examiner* — Leo B Tentoni
(74) *Attorney, Agent, or Firm* — Christian M. Best

(57) ABSTRACT

A method of making a three-dimensional web is provided. The method comprises spinning continuous filaments from a spinneret, moving the spun continuous filaments along a travel path having an end, and rotating a collection surface at or proximate to the end of the travel path. The collection surface comprises cavities and land areas. The land areas are tangentially planar with an outer surface of the collection surface. The cavities are recessed with respect to the outer surface of the collection surface. The method comprises applying a fluid pressure to the collection surface and collecting the filaments on the collection surface to create an intermediate three-dimensional web having first regions formed in the cavities and second regions formed on the land areas. The first and second regions differ in at least one intensive property. The method comprises bonding the intermediate web using a bonding operation to form a final three-dimensional web.

26 Claims, 19 Drawing Sheets

(51) Int. Cl.
  *B29C 69/00*   (2006.01)
  *B32B 37/20*   (2006.01)
  *D01D 5/088*   (2006.01)
  *D01D 5/32*    (2006.01)
  *D01D 5/34*    (2006.01)
  *D01D 7/00*    (2006.01)
  *D04H 3/018*   (2012.01)
  *D04H 3/033*   (2012.01)
  *D04H 3/14*    (2012.01)
  *D04H 3/16*    (2006.01)
  *D04H 5/02*    (2012.01)
  *D04H 5/06*    (2006.01)
  *D06C 23/04*   (2006.01)

(52) U.S. Cl.
  CPC ............ *D04H 3/018* (2013.01); *D04H 3/033* (2013.01); *D04H 3/14* (2013.01); *D04H 5/02* (2013.01); *B29C 2793/0045* (2013.01); *D10B 2509/026* (2013.01)

(58) Field of Classification Search
  CPC ........... D01D 5/08; D01D 5/088; D01D 5/32; D01D 5/34; D01D 7/00; D04H 3/16; D04H 5/06; D06C 23/04
  USPC ......... 264/103, 156, 172.14, 172.15, 211.12, 264/211.2, 555; 156/73.1, 167, 181, 324
  See application file for complete search history.

(56) References Cited

U.S. PATENT DOCUMENTS

| | | |
|---|---|---|
| 10,655,257 B2 | 5/2020 | Ashraf et al. |
| 10,765,565 B2 | 9/2020 | Ashraf et al. |
| 10,772,768 B2 | 9/2020 | Ashraf et al. |
| 10,858,768 B2 | 12/2020 | Ashraf et al. |
| 10,888,471 B2 | 1/2021 | Ashraf et al. |
| 10,934,645 B2 | 3/2021 | Ashraf et al. |
| 10,968,552 B2 | 4/2021 | Ashraf et al. |
| 11,090,197 B2 | 8/2021 | Ashraf et al. |
| 11,149,360 B2 | 10/2021 | Ashraf |
| 11,160,694 B2 | 11/2021 | Ashraf et al. |
| 11,214,893 B2 | 1/2022 | Ashraf et al. |
| 11,324,641 B2 | 5/2022 | Ashraf et al. |
| 11,401,640 B2 | 8/2022 | Ashraf |
| 11,427,943 B2 | 8/2022 | Ashraf |
| 11,505,884 B2 | 11/2022 | Ashraf |
| 11,547,613 B2 | 1/2023 | Ashraf |
| 11,634,838 B2 | 4/2023 | Ashraf |
| 11,661,689 B2 | 5/2023 | Ashraf |
| 11,666,488 B2 | 6/2023 | Ashraf et al. |
| 11,730,638 B2 | 8/2023 | Ashraf |
| 11,746,441 B2 | 9/2023 | Ashraf |
| 11,773,521 B2 | 10/2023 | Ashraf |
| 11,819,393 B2 | 11/2023 | Arora |
| 11,826,230 B2 | 11/2023 | Ashraf |
| 2002/0009941 A1* | 1/2002 | Clark .................. D04H 3/16 442/364 |
| 2002/0089079 A1* | 7/2002 | Shelley ............... D04H 5/06 264/103 X |
| 2003/0203196 A1* | 10/2003 | Trokhan .............. D04H 3/16 264/555 X |
| 2007/0096366 A1* | 5/2007 | Schneider ........... B29C 51/24 425/385 |
| 2008/0014408 A1* | 1/2008 | Muth .................. B26F 1/24 264/156 |
| 2010/0323575 A1* | 12/2010 | He ..................... D04H 1/43825 264/103 |
| 2015/0071472 A1* | 3/2015 | Lee .................... D01D 5/0084 381/334 |
| 2017/0029994 A1 | 2/2017 | Ashraf |
| 2018/0214321 A1 | 8/2018 | Ashraf |
| 2019/0374388 A1 | 12/2019 | Giovanni et al. |
| 2019/0374405 A1 | 12/2019 | Giovanni et al. |
| 2019/0374407 A1 | 12/2019 | Giovanni et al. |
| 2019/0380887 A1 | 12/2019 | Ashraf et al. |
| 2020/0100956 A1 | 4/2020 | Ashraf et al. |
| 2020/0299881 A1 | 9/2020 | Ashraf |
| 2020/0345563 A1 | 11/2020 | Ashraf et al. |
| 2020/0347533 A1 | 11/2020 | Ashraf et al. |
| 2020/0360198 A1 | 11/2020 | Ashraf et al. |
| 2020/0397629 A1 | 12/2020 | Aviles et al. |
| 2021/0040661 A1 | 2/2021 | Ashraf et al. |
| 2021/0169710 A1 | 6/2021 | Ashraf et al. |
| 2021/0369511 A1 | 12/2021 | Giovanni et al. |
| 2022/0074094 A1 | 3/2022 | Ashraf et al. |
| 2022/0151837 A1 | 5/2022 | Ashraf et al. |
| 2022/0192897 A1 | 6/2022 | Whitely et al. |
| 2023/0036659 A1 | 2/2023 | Ashraf et al. |
| 2023/0167592 A1 | 6/2023 | Ashraf et al. |
| 2023/0212790 A1 | 7/2023 | Ashraf et al. |
| 2023/0240911 A1 | 8/2023 | Ashraf et al. |
| 2023/0248589 A1 | 8/2023 | Ashraf et al. |
| 2023/0250568 A1 | 8/2023 | Ashraf et al. |
| 2023/0277389 A1 | 9/2023 | Ashraf et al. |
| 2023/0313428 A1 | 10/2023 | Ashraf |
| 2023/0320910 A1 | 10/2023 | Ashraf et al. |
| 2023/0329924 A1 | 10/2023 | Ashraf et al. |
| 2023/0349074 A1 | 11/2023 | Ashraf et al. |
| 2023/0383448 A1 | 11/2023 | Ashraf et al. |

FOREIGN PATENT DOCUMENTS

| | | |
|---|---|---|
| WO | 2017105997 A1 | 6/2017 |
| WO | 2018112144 A1 | 6/2018 |
| WO | 2018112146 A1 | 6/2018 |
| WO | 2020190627 A1 | 9/2020 |
| WO | 2021242592 A1 | 12/2021 |

OTHER PUBLICATIONS

PCT Search Report and Written Opinion for PCT/US2024/011718 dated May 6, 2024, 14 pages.

* cited by examiner

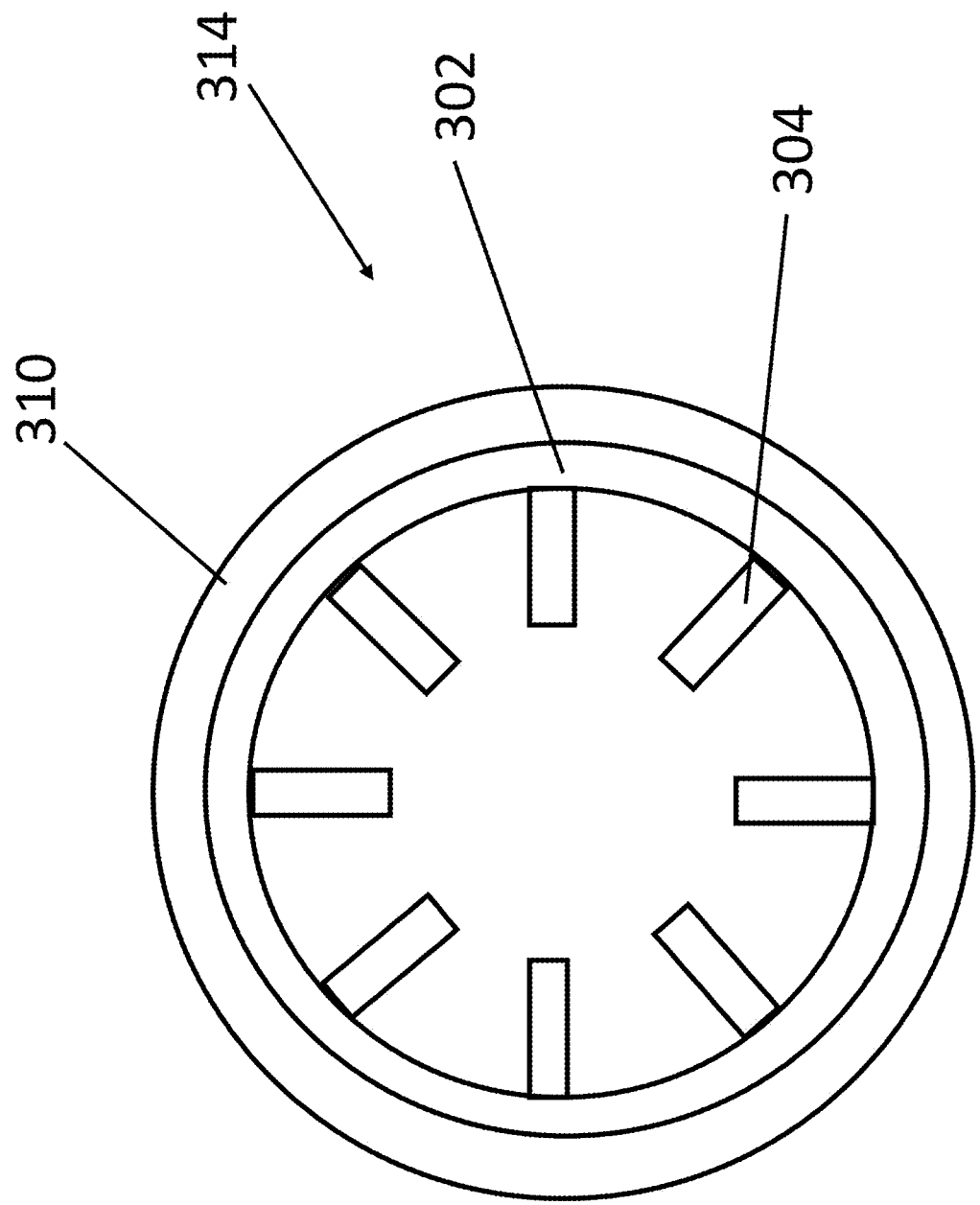

METHODS FOR MAKING THREE-DIMENSIONAL WEBS

CROSS REFERENCE TO RELATED APPLICATION

This application claims priority, under 35 U.S.C. § 119, to PCT Patent Application PCT/CN2023/073146, filed on Jan. 19, 2023, the entire disclosure of which is hereby incorporated by reference.

FIELD

The present disclosure is directed to methods of making three-dimensional webs, and more particularly, is directed to methods of making three-dimensional webs using a rotating collection surface.

BACKGROUND

Webs, such as nonwoven webs, are used in many industries, such as the hygiene industry and the medical industry, for example. One use of nonwoven webs in the hygiene industry is in absorbent articles, such as taped diapers, pants, sanitary napkins, and adult incontinence products, for example. Such nonwoven webs may be used in absorbent articles as topsheets, outer cover nonwovens, portions of waistbands, portions of front or back ears (taped) or side panels (pants), acquisition materials, masking materials, landing zones, and core bags, for example. Typical nonwoven webs are generally flat and have a uniform basis weight, caliper, volumetric density, opacity, and air permeability. Some consumers, especially high end consumers, desire more intricate and complex nonwoven webs with three-dimensional features. Manufacturing these more intricate and complex nonwoven webs is expensive and involved using the currently existing techniques. As such, a need exists for more cost effective and simpler techniques for manufacturing these more intricate and complex nonwoven webs.

SUMMARY

The present disclosure provides methods for making intricate and complex three-dimensional webs in a more cost effective and more simple manner than previous techniques. The present inventors have found an alternative solution to using traditional three-dimensional nonwoven making belts while achieving the same or similar benefit as such belts. The present inventors have discovered that the intricate and complex three-dimensional nonwoven webs may be produced using a rotating collection surface with various surface features. The rotating collection surface achieves a much smaller footprint than a traditional nonwoven making belt. In some instances, the rotating collection surface may be a drum or a drum with a three-dimensional texture sleeve positioned over the drum. This rotating collection surface produces high quality three-dimensional nonwoven webs that are highly consumer desirable.

The present disclosure is directed, in part, to a method of making a three-dimensional web. The method may comprise spinning continuous filaments from a spinneret, moving the spun continuous filaments along a travel path having an end, and rotating a collection surface at the end of the travel path. The collection surface may comprise cavities and land areas. The land areas may be tangentially planar with an outer surface of the collection surface. The cavities may be recessed with respect to the outer surface of the collection surface. The cavities may have a higher fluid permeability than the raised land areas. The method may comprise applying a fluid pressure to the collection surface and collecting the filaments on the collection surface to create an intermediate three-dimensional web having first regions formed in the cavities and second regions formed on the land areas. The first regions and second regions may differ in at least one intensive property, such as basis weight, volumetric density, caliper, air permeability, and/or opacity. In some instances, the intensive property is basis weight. The value of the intensive property in the first regions and the second regions may be greater than zero. The method may comprise bonding the intermediate three-dimensional web using a bonding operation, such as air-through bonded, for example, to form a final three-dimensional web.

The present disclosure is also directed, in part, to a method of making a three dimensional web. The method may comprise spinning continuous filaments from a spinneret, moving the spun continuous filaments along a travel path having an end, and rotating a collection surface at or proximate to the end of the travel path. The collection surface may comprise land areas and raised areas. The land areas may be tangentially planar with an outer surface of the collection surface. The raised areas may extend outwardly from the outer surface of the collection surface. The land areas may have a higher fluid permeability than the raised areas. The method may comprise applying a fluid pressure to the collection surface and collecting the filaments on the collection surface to create an intermediate three-dimensional web having first regions formed on the land areas and second regions formed on the raised areas. The first regions and second regions may differ in at least one intensive property, such as basis weight, volumetric density, caliper, air permeability, and/or opacity. In some instances, the intensive property is basis weight. The method may comprise bonding the intermediate three-dimensional web using a bonding operation to form a final three-dimensional web.

BRIEF DESCRIPTION OF THE DRAWINGS

While the specification concludes with claims particularly pointing out and distinctly claiming the subject matter which is regarded as forming the present invention, it is believed that the present disclosure will be better understood from the following description which is taken in conjunction with the accompanying drawings in which the designations are used to designate substantially identical elements and in which:

FIG. 19 is another schematic example of a rotating collection surface with a support screen.

DETAILED DESCRIPTION

Figure 1:
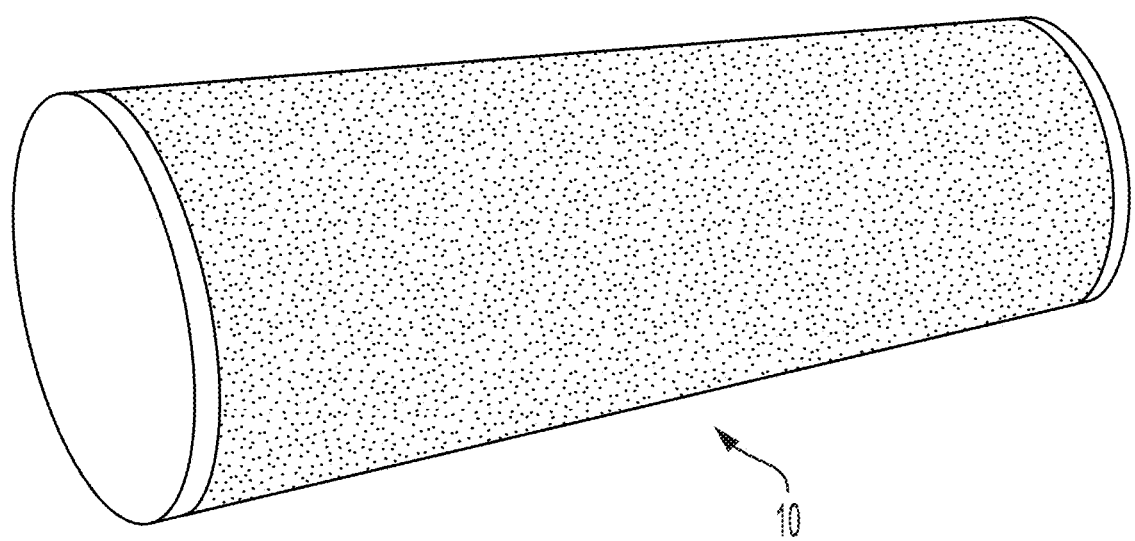
FIG. 1 is a perspective view of a three-dimensional sleeve that forms a portion of a rotating collection surface of the present disclosure.

Various non-limiting forms of the present disclosure will now be described to provide an overall understanding of the principles of the structure, function, manufacture, and use of the methods for making three-dimensional webs disclosed herein. One or more examples of these non-limiting forms are illustrated in the accompanying drawings. Those of ordinary skill in the art will understand that the methods for making three-dimensional webs specifically described herein and illustrated in the accompanying drawings are non-limiting example forms and that the scope of the various non-limiting forms of the present disclosure are defined solely by the claims. The features illustrated or described in connection with one non-limiting form may be combined with the features of other non-limiting forms. Such modifications and variations are intended to be included within the scope of the present disclosure.

The term "absorbent article(s)" is used herein to refer to consumer products whose primary function is to absorb and retain bodily exudates and wastes. Absorbent articles as used herein may refer to taped diapers, pants, and/or adult incontinence pants, for example, or other suitable absorbent articles.

The term "machine direction" (MD) is used herein to refer to the primary direction of material, web, or article flow through a process. In various manufacturing and converting processes, such as a bi-fold process, it may be possible to have more than one machine direction when an article is undergoing simultaneous processes. In other words, a manufacturing line may have an overall machine direction, but a material or an article may travel in directions other than the overall machine direction as it passes through various processes along the manufacturing line. For example, a discrete article having a trailing end portion and a leading end portion, each portion being attached to the surface of a different roll and/or conveyor may travel in two different directions simultaneously. In this example, both directions of travel may be considered the machine direction.

The term "cross direction" (CD) is used herein to refer to a direction that is generally perpendicular to the machine direction.

The term "rotating collection surface" is used herein to refer to one of: 1) a rotating member or drum with a three-dimensional textured outer surface; 2) a rotating member or drum with a non-three-dimensional textured outer surface but with capability for variable vacuum throughout at least portions of the outer surface of the rotating member or drum; and 3) a three-dimensional sleeve positioned over a rotating member or drum. In all instances, the outer surface of the rotating member or drum and the texture sleeve will have areas that are fluid (e.g., air) permeable, but filament impermeable. This allows for basis weight movement as the filaments are collected on the collection surface. A rotating collection surface is not a belt and not does not comprise resin or photocurable resin. At least portions of the rotating collection surface, in a filament lay down zone, may not be or are not perpendicular to at least some filaments being laid down onto it because of the curved or arcuate nature of the rotating collection surface. Stated differently, the rotating collection surface may not have a flat planer portion, but instead may have a curved outer circumference.

Figure 2:
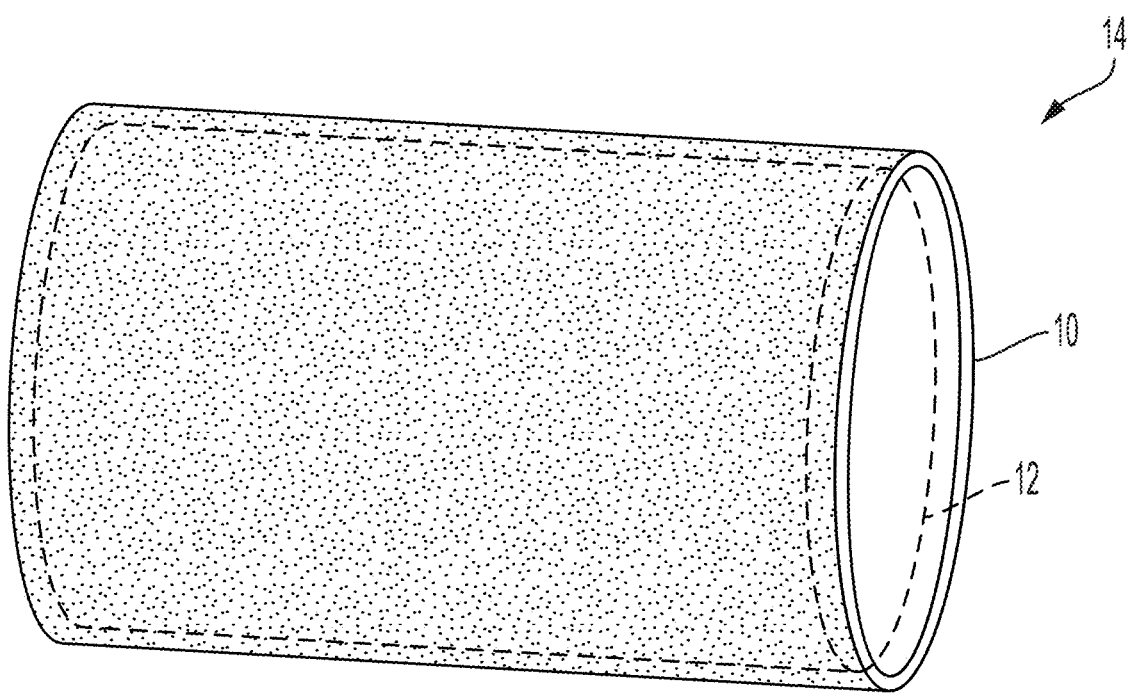
FIG. 2 is a perspective view of a three-dimensional sleeve positioned over a rotating member which together form a rotating collection surface of the present disclosure.
Figure 3:
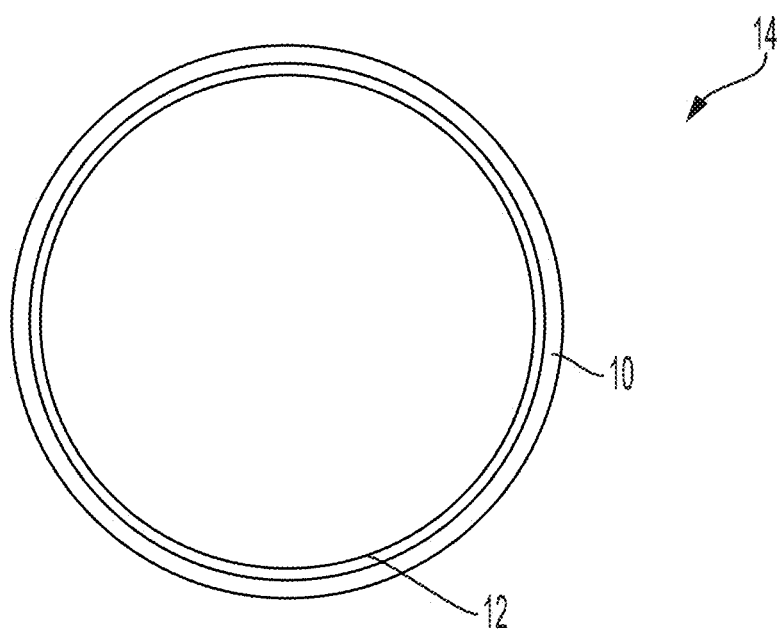
FIG. 3 is side view of the rotating collection surface of FIG. 2.

FIG. 1 is a perspective view of a three-dimensional sleeve 10 that forms a portion of a rotating collection surface of the present disclosure. The three-dimensional sleeve 10 may have portions that are fluid permeable and portions that impart texture to a web, such as a nonwoven web. The three-dimensional sleeve 10 may be configured to be positioned over a rotating member or drum to form a rotating collection surface. FIG. 2 is a perspective view of a three-dimensional sleeve 10 positioned over a rotating member or drum 12 which together form a rotating collection surface 14 of the present disclosure. The rotating collection surface, the three-dimensional sleeve, and the rotating member or drum of the present disclosure are not a belt, which is typically used to create nonwoven webs. Although not illustrated in FIG. 2, it will be understood that the three-dimensional sleeve 10 may have texture and may have portions that are fluid permeable. The rotating member or drum 12 may also have portions that are fluid permeable. As such, vacuum may be provided through the rotating member or drum 12 and through the three-dimensional sleeve 10 such that filaments are collected on the rotating collection surface 14. The rotating member or drum 10 may be more or less fluid permeable than the three-dimensional sleeve 10. In some instances, the rotating member or drum 10 may have a fluid permeability that is the same as the fluid permeability of the three-dimensional sleeve 10. FIG. 3 is side view of the rotating collection surface 14 of FIG. 2 showing both the three-dimensional sleeve 10 and the rotating member or drum 12. The rotating member or drum 12 and the three-dimensional sleeve 10 may be free of photocurable resin or resin.

Figure 4:
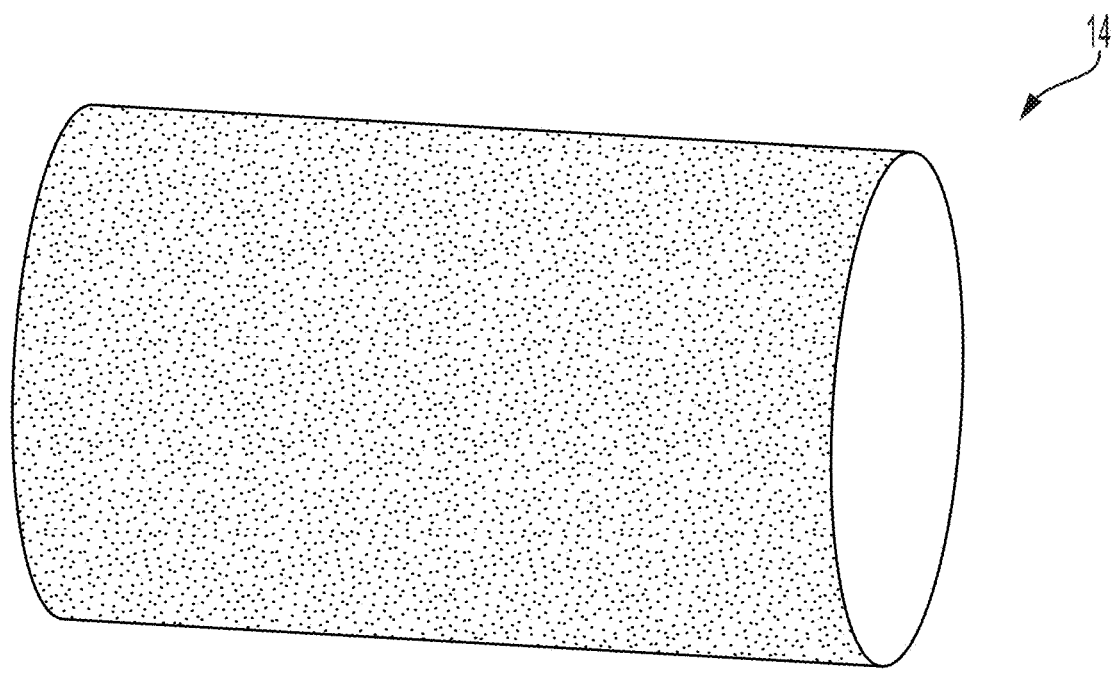
FIG. 4 is a perspective view of a rotating collection surface that does not include a three-dimensional sleeve of the present disclosure.

FIG. 4 is a perspective view of a rotating collection surface 14 that does not include a three-dimensional sleeve of the present disclosure. It will be understood that the outer surface of the rotating collection surface 14 may have portions with texture and may have portions that are fluid permeable such that filaments are collected on the rotating collection surface 14. In some instances a rotating collection surface may be provided without texture, but instead be provided only with fluid permeable portions on the outer surface. In such an instance, vacuum may be preferentially applied to portions of the outer surface to cause filaments to be drawn to those vacuum areas relative to areas where vacuum may not be present. This may lead to a variable basis weight web because of the filament movement into the certain areas of vacuum during filament lay down.

Regardless of what form the rotating collection surface takes, including the three forms described herein, the rotating member or drum or the three-dimensional sleeve may or may not be circular. For example, the rotating member or drum and/or the three-dimensional sleeve may be ovate or other non-circular shape.

Figure 5:
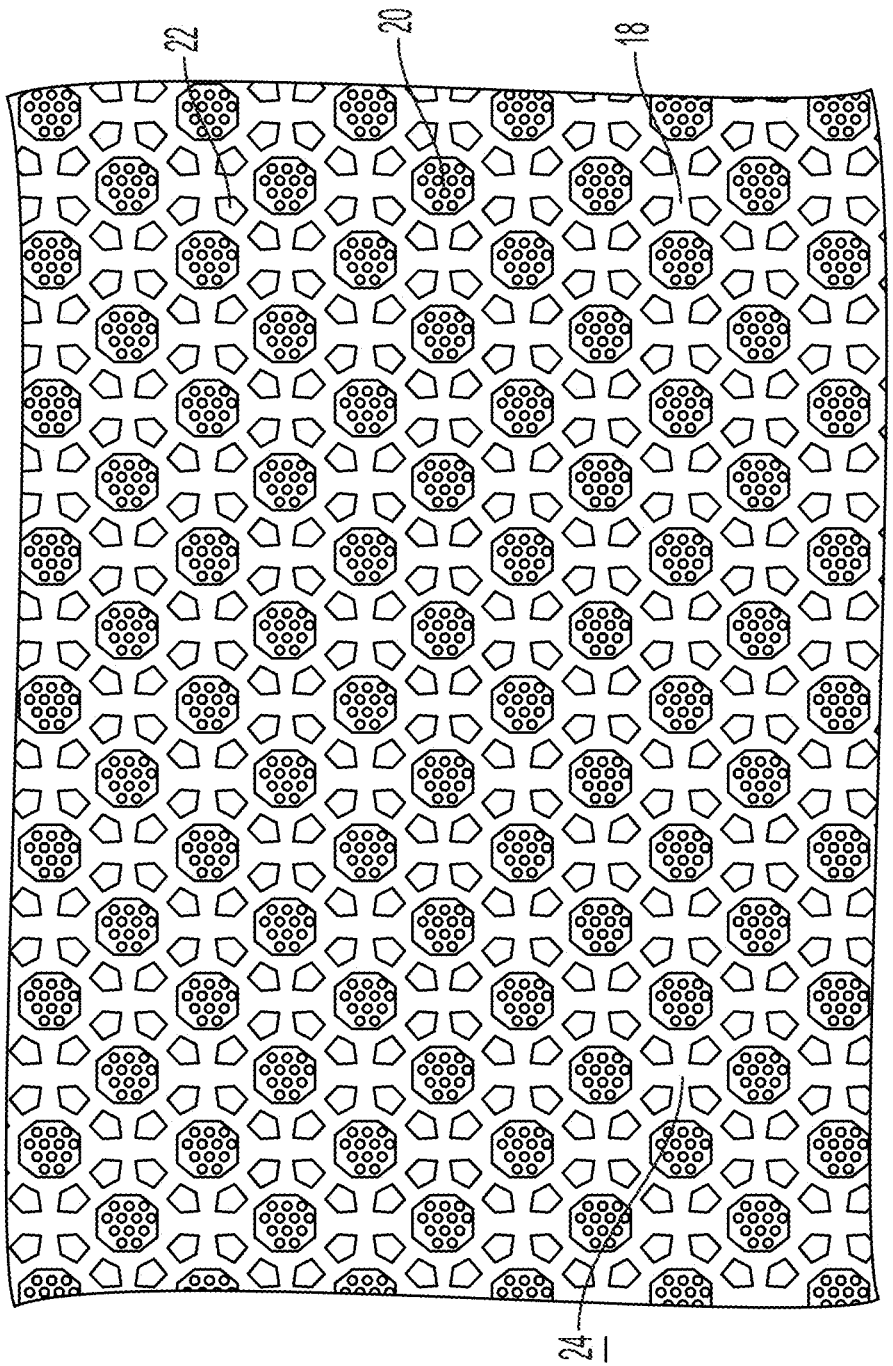
FIG. 5 is an exploded view of a portion of a first example three-dimensional sleeve or outer surface of a rotating collection surface of the present disclosure.

FIG. 5 is an exploded view of a portion of a first example three-dimensional sleeve or outer surface of a rotating collection surface of the present disclosure. It will be understood that texture may be imparted to a three-dimensional sleeve or to an outer surface of a rotating member or drum. The texture may comprise land areas 18, cavities 20, and raised areas 22. The land areas 18, the cavities 20, and/or the raised areas 22 may be free of photocurable resin or resin. The land areas 18 may be tangentially planar with an outer surface 24 of the collection surface. The rotating collection surfaces disclosed herein may have land areas of different sizes and/or shapes or may have land areas of all the same sizes and/or shapes. The cavities 20 may be recessed with respect to the outer surface 24 of the collection surface. The cavities 20 may be recessed about 0.4 mm to about 20 mm, about 0.4 mm to about 15 mm, about 0.5 mm to about 10 mm, about 0.5 mm to about 5 mm, or about 0.8 mm to about 2.5 mm relative to the outer surface 24. The cavities 20 may have a diameter, or a major dimension if not circular, in the X-Y plane of about 0.4 mm to about 15 mm, about 0.4 mm to about 10 mm, about 0.4 mm to about 8 mm, about 0.5 mm to about 6 mm, or about 0.5 mm to about 4 mm. The cavities 20 may have any suitable shape, such as round, ovate, diamond-shaped, triangular, and/or rectangular, for example. The rotating collection surfaces disclosed herein may have cavities of different sizes and/or shapes or may have cavities of all the same sizes and/or shapes. The cavities 20 may have a permeable bottom surface such that fluid pressure, such as vacuum, may be provided to the three-dimensional sleeve or outer surface of the rotating collection surface. The raised areas 22 may extend outwardly from the outer surface 24 of the collection surface. The raised areas 22 may extend outwardly from the outer surface 24 about 0.5 mm to about 20 mm, about 0.5 mm to about 15 mm, about 0.5 mm to about 10 mm, about 1 mm to about 8 mm, about 1 mm to about 6 mm, or about 2 mm to about 5 mm. A diameter, or a major dimension if not circular, of the raised areas 22 most proximate to the outer surface 24 may be in the range of about 0.4 mm to about 15 mm, about 0.5 mm to about 10 mm, about 1 mm to about 8 mm, or about 1 mm to about 6 mm. The rotating collection surfaces disclosed herein may have raised areas of different sizes and/or shapes or may have raised areas of all the same sizes and/or shapes. Such a textured collection surface as shown in FIG. 5 may result in a web, such as a nonwoven web, having projections formed in the cavities 20, projections or apertures formed by the raised areas 22, and planar areas formed by the land areas 18. Essentially, an intricate and complex three-dimensional web is formed that is highly consumer desirable using the rotating collection surface.

The cavities 20 may comprise a number of openings 21 to enable their permeable bottom surface. The openings 21 may be circular or non-circular, such as elongate or ovate, for example. A diameter or major axis of the openings 21 may be in the range of about 150 microns to about 2,000 microns, or about 250 microns to about 600 microns, for example. Upon information and belief, the openings 21 should not be too small or too large. If the openings 21 are too small, not enough vacuum may be present in the cavities 20 to draw filaments into the cavities 20 and/or fill the cavities 20 with filaments. If the openings 21 are too large, filaments may excessively extend partially or fully through the openings 21, which may create issues when releasing the web from the cavities 20. In normal operation, some filaments may be expected to extend partially through the openings 21, while still achieving acceptable web release. Similar openings in the cavities may have similar characteristics as the openings described here.

The open area of the various rotating collection surfaces discussed herein may be in the range of about 5% to about 55%, or about 8% to about 40%, for example. Open area of the various rotating collection surfaces should be considered so that suitable three-dimensional formation may be achieved while not having such a high open area that the rotating collection surfaces are mechanically weak and/or excessive filament penetration (into the openings) occurs.

The air permeability of the various rotating collection surfaces discussed herein, without filaments positioned thereon, may be in the range of about 45 $m^3/m^2/min$ to about 300 $m^3/m^2/min$, about 60 $m^3/m^2/min$ to about 250 $m^3/m^2/min$, or about 75 $m^3/m^2/min$ to about 200 $m^3/m^2/min$.

Figure 6:
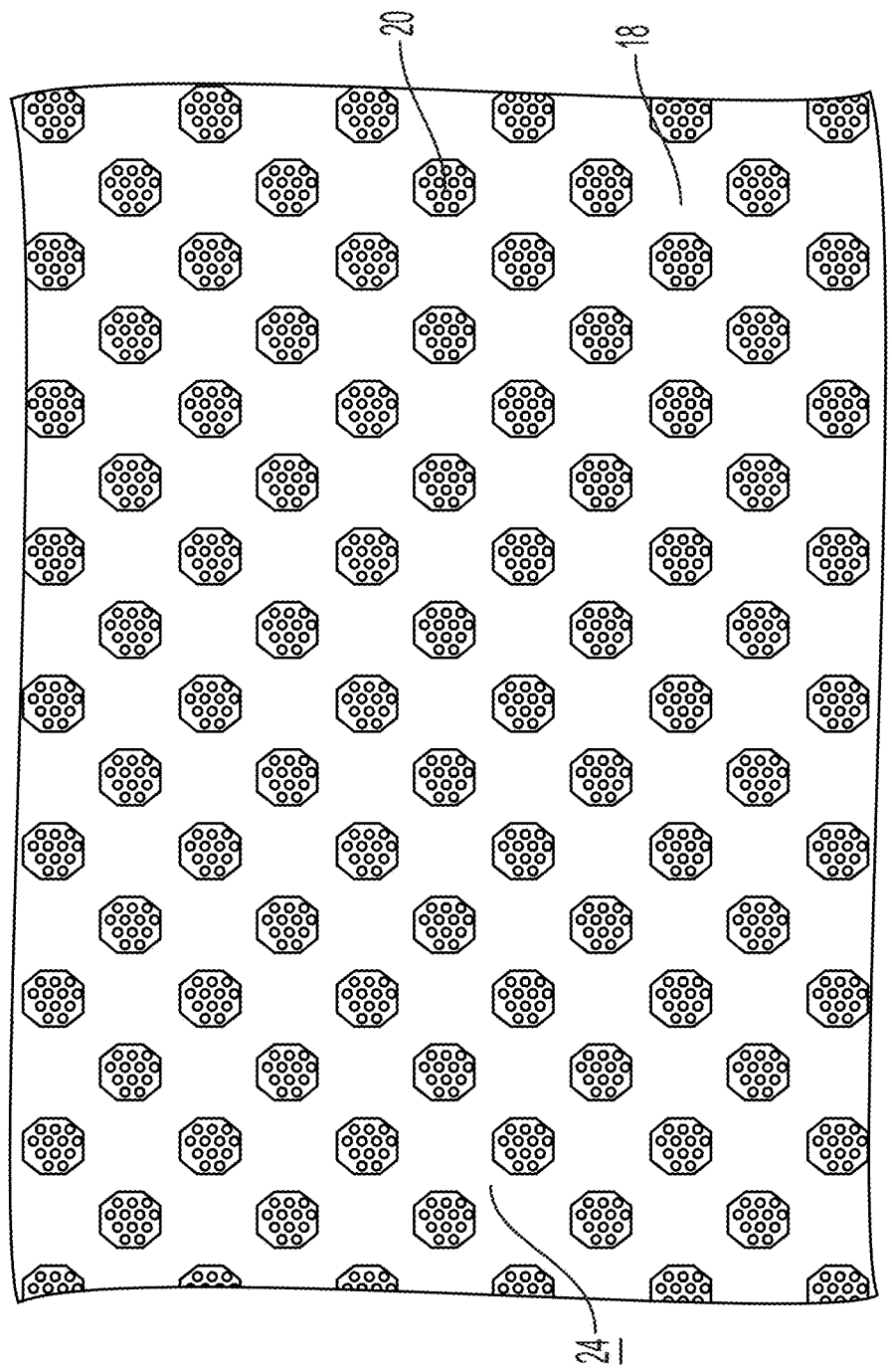
FIG. 6 is an exploded view of a portion of a second example three-dimensional sleeve or outer surface of a rotating collection surface of the present disclosure.

FIG. 6 is an exploded view of a portion of a second example three-dimensional sleeve or outer surface of a rotating collection surface of the present disclosure. It will be understood that texture may be imparted to a three-dimensional sleeve or an outer surface of a rotating member or drum. The texture may comprise land areas 18 and cavities 20. The land areas 18 may be tangentially planar with an outer surface 24 of the collection surface. The cavities 20 may be recessed with respect to the outer surface 24 of the collection surface. The land areas 18 and the cavities 20 may be free of photocurable resin or resin. The cavities 20 may have a permeable bottom surface such that fluid pressure, such as vacuum, may be provided to the three-dimensional sleeve or outer surface of the rotating collection surface. Such a textured collection surface as shown in FIG. 6 may result in a web, such as a nonwoven web, having projections formed in the cavities 20 and planar areas formed by the land areas 18. Essentially an intricate and complex three-dimensional web is formed that is highly consumer desirable using the rotating collection surface.

Figure 7:
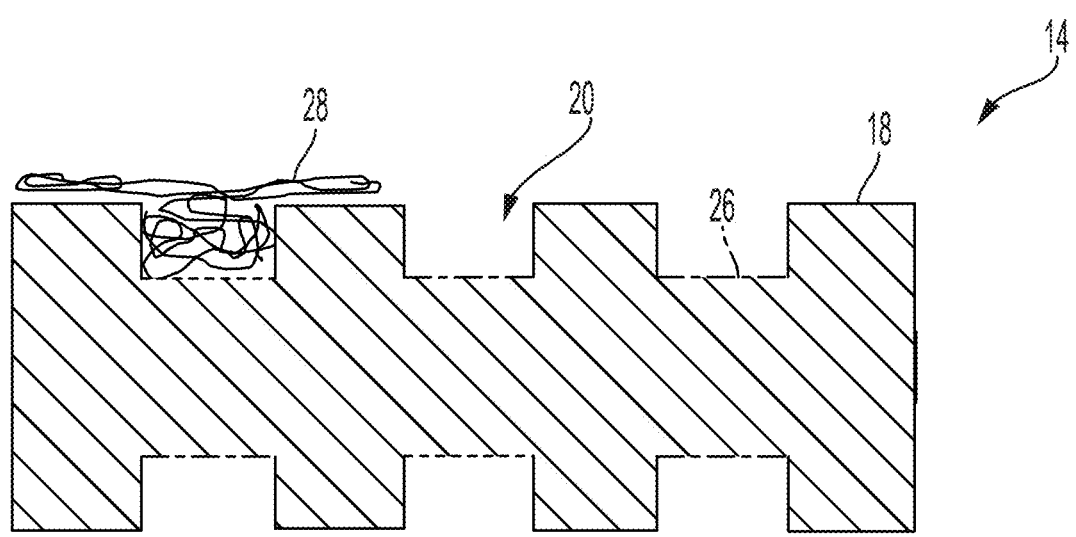
FIGS. 7-12 are schematic cross-sectional examples of textures in either a rotating collection surface that is a rotating member or drum or a rotating collection surface that comprises a three-dimensional sleeve positioned on a rotating member or drum of the present disclosure.

FIGS. 7-12 are schematic examples of three-dimensional textures contemplated for either a rotating collection surface 14 that is a rotating member or drum or a rotating collection surface 14 that comprises a three-dimensional sleeve 10 positioned on a rotating member or drum of the present disclosure. The rotating collection surface 14 that is a rotating member or drum or a rotating collection surface 14 that comprises a three-dimensional sleeve 10 may be free of photocurable resin or resin. FIGS. 7-12 are not to scale and are used merely to illustrate some concepts of three-dimensional texture. FIG. 7 illustrates a rotating collection surface 14 that comprises land areas 18 and cavities 20. Bottom portions 26 of the cavities 20 are shown to be fluid permeable with dashed lines. When vacuum is provided to the bottom portions 26, filaments 28 will collect more heavily in the cavities 20 than in the land areas 18 as illustrated in a portion of FIG. 7. The portion of the filaments within the cavities 20 may have a different intensive property in a web than filaments on the land areas 18. The intensive property may be one or more of basis weight, volumetric density, caliper, air permeability, and/or opacity. In some instances, the intensive property may be basis weight. In the example of FIG. 7, the portions of the web within the cavities 20 will have a higher basis weight, volumetric density, thickness, air permeability, and/or opacity relative to the portions of the webs on the land areas 18. The higher filament 28 accumulation in the cavities 20 is due to the vacuum primarily being supplied to the cavities 20. It is also within the scope of the present disclosure to provide vacuum or fluid pressure to the land areas 18, but that vacuum or fluid pressure may typically be less than the vacuum or fluid pressure applied to the cavities 20 to achieve a higher intensive property of basis weight, volumetric density, caliper, air permeability and/or opacity in portions of the web within the cavities 20. Height differences between the cavities 20 and the land areas 18 may be in the range of about 0.1 mm to about 15 mm, about 0.2 mm to about 10 mm, about 0.2 mm to about 5 mm, about 0.3 mm to about 3 mm, about 0.3 mm to about 2 mm, greater than about 0.3 mm, greater than about 0.5 mm, or greater than about 0.8 mm. Having these height differentials between the cavities 20 and the land areas 18 enables sufficient three-dimensional feature formation that is visually appealing in a final three-dimensional web.

Figure 8:
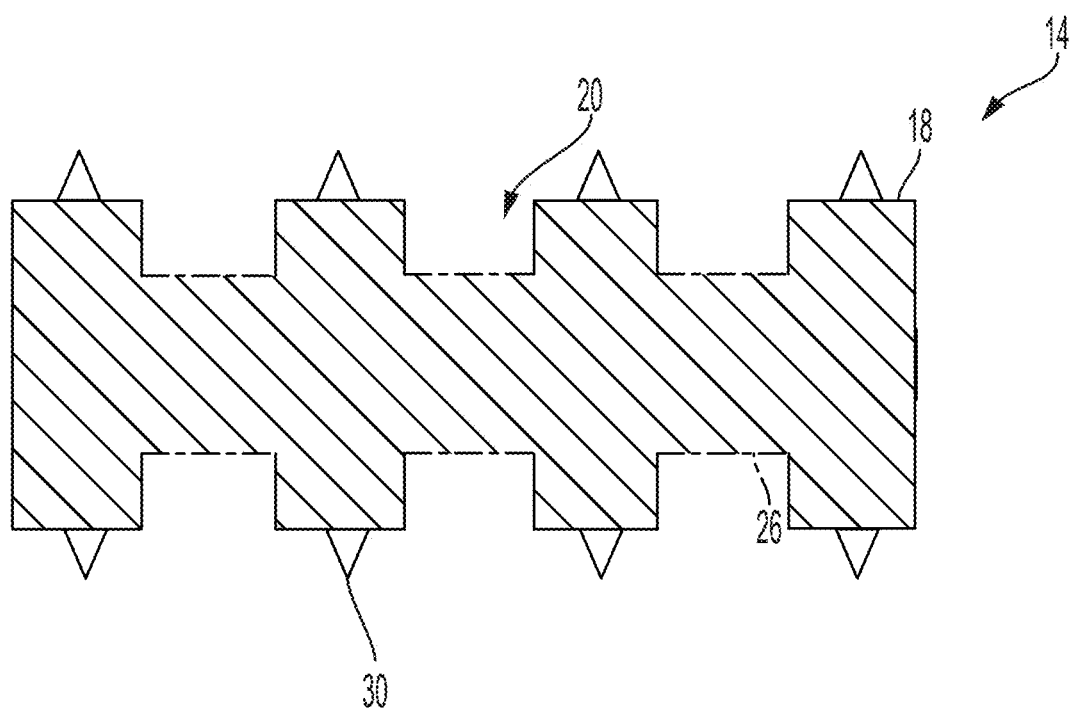

FIG. 8 illustrates a rotating collection surface 14 that comprises land areas 18 and cavities 20. Bottom portions 26 of the cavities 20 are shown to be fluid permeable with dashed lines. When vacuum is provided to the bottom portions 26, filaments may collect more heavily in the cavities 20 than in the land areas 18 as illustrated above in FIG. 7. The primary difference between the rotating collection surface of FIG. 7 and FIG. 8 is the addition of pins 30 on or extending outwardly from the land areas 18. The pins 30 may have a height relative to the land areas 18 of about 0.4 mm to about 20 mm, about 0.4 to about 15 mm, about 0.5 mm to about 10, about 0.5 mm to about 8 mm, or about 0.6 mm to about 6 mm. A diameter, or a major dimension if not circular, of the pins 30 most proximate to the outer surface 24 may be in the range of about 0.4 mm to about 15 mm, about 0.5 mm to about 10 mm, about 1 mm to about 8 mm, or about 1 mm to about 6 mm. The pins 30 may be used to create apertures in a portion of the web that is formed on the land areas 18. It is possible to provide vacuum through the land areas 18 and/or pins 30, although that vacuum force may likely be less than the vacuum force provided in the cavities 20 to achieve higher filament concentration in the cavities 20. Pins, the same as or similar to pins 30, may also be provided in the cavities 20 to create apertures in portions of the web formed in the cavities 20. Height differences between the cavities 20 and the land areas 18 and the land areas 18 and the pins 30 may be in the range of about 0.1 mm to about 15 mm, about 0.2 mm to about 10 mm, about 0.2 mm to about 5 mm, about 0.3 mm to about 3 mm, about 0.3 mm to about 2 mm, greater than about 0.3 mm, greater than about 0.5 mm, or greater than about 0.8 mm. Having these height differentials between the cavities 20 and the land areas 18 and the land areas 18 and the pins 30 enables sufficient three-dimensional feature formation that is visually appealing in a final three-dimensional web.

Figure 9:
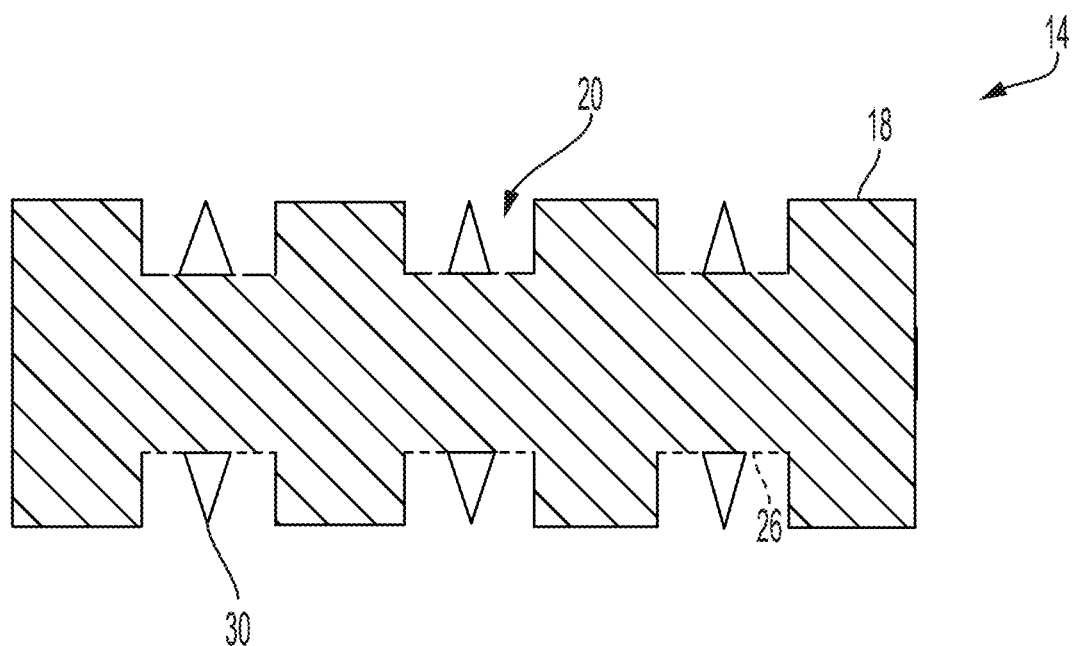

FIG. 9 illustrates a rotating collection surface 14 that comprises land areas 18 and cavities 20. Bottom portions 26 of the cavities 20 are shown to be fluid permeable with dashed lines. When vacuum is provided to the bottom portions 26, filaments may collect more heavily in the cavities 20 than in the land areas 18 as illustrated above in FIG. 7. In FIG. 9, the pins 30 are illustrated in the cavities 20. The pins 30 may create apertures in the portions of the web formed in the cavities 20. Portions of the web formed on the land areas 18 may be planar. It is possible to provide some vacuum through the pins 30 if desired. It is also possible to provide vacuum through the land areas 18, although that vacuum force may likely be less than the vacuum force provided in the cavities 20 to achieve higher filament concentration in the cavities 20. Pins, the same as or similar to pins 30, may also be provided in the land areas 18 to create apertures in portions of the web formed on the land areas 18. Height differences between the cavities 20 and the land areas 18 or pins 30 may be in the range of about 0.1 mm to about 15 mm, about 0.2 mm to about 10 mm, about 0.2 mm to about 5 mm, about 0.3 mm to about 3 mm, about 0.3 mm to about 2 mm, greater than about 0.3 mm, greater than about 0.5 mm, or greater than about 0.8 mm. Having these height differentials between the cavities 20 and the land areas 18 or pins 30 enables sufficient three-dimensional feature formation that is visually appealing in a final three-dimensional web.

Figure 10:
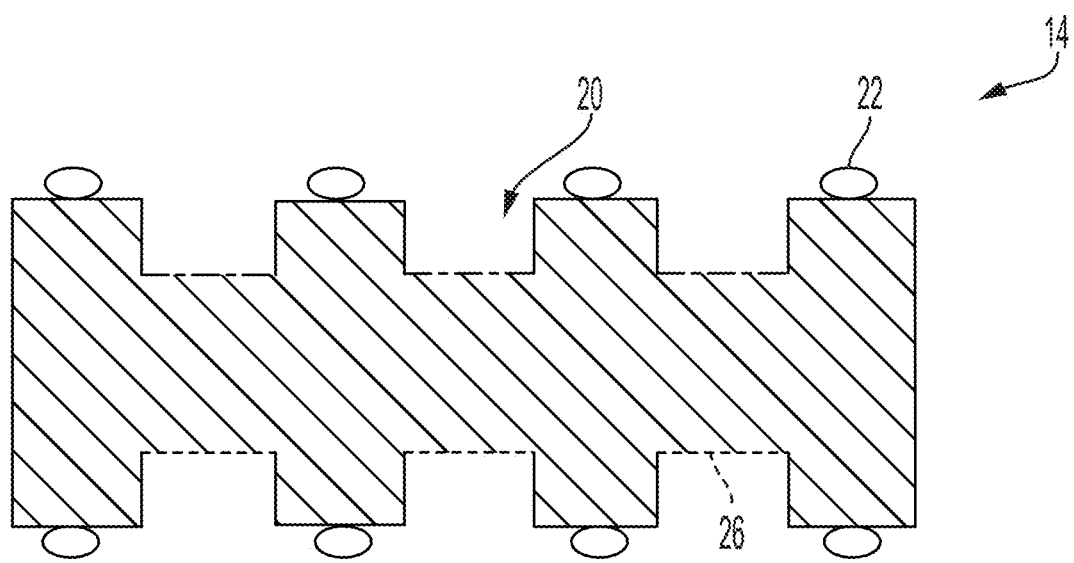

FIG. 10 illustrates a rotating collection surface 14 that comprises land areas 18 and cavities 20. Bottom portions 26 of the cavities 20 are shown to be fluid permeable with dashed lines. When vacuum is provided to the bottom portions 26, filaments may collect more heavily in the cavities 20 than in the land areas 18 as illustrated above in FIG. 7. In FIG. 10, the land areas 18 include raised areas 22 that form projections in portions of the web formed by the land areas 18. It is possible to provide vacuum through the raised areas 22 and/or land areas 18 in some instances, although that vacuum may typically be provided at a strength that is less than the vacuum provided in the cavities 20 to achieve higher filament concentration in the cavities 20. Height differences between the cavities 20 and the land areas 18 and the land areas 18 and the raised areas 22 may be in the range of about 0.1 mm to about 15 mm, about 0.2 mm to about 10 mm, about 0.2 mm to about 5 mm, about 0.3 mm to about 3 mm, about 0.3 mm to about 2 mm, greater than about 0.3 mm, greater than about 0.5 mm, or greater than about 0.8 mm. Having these height differentials between the cavities 20 and the land areas 18 and the land areas 18 and the raised areas 22 enables sufficient three-dimensional feature formation that is visually appealing in a final three-dimensional web.

Figure 11:
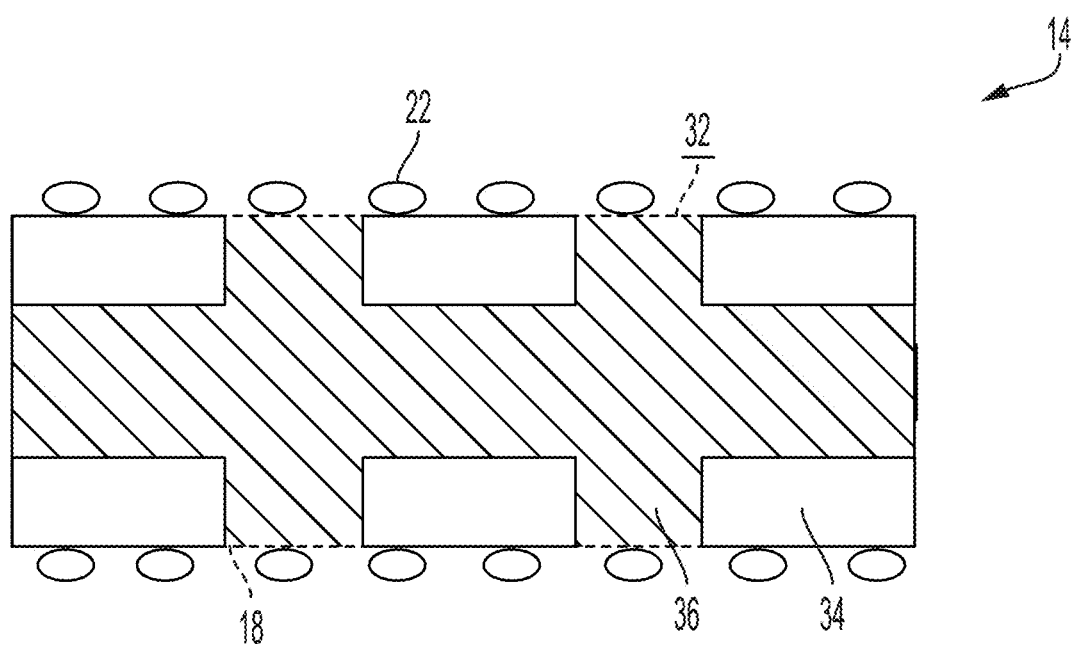

FIG. 11 illustrates a rotating collection surface 14 with a fluid permeable outer surface 32. The outer surface 32 mayor may not comprise raised areas 22. If the raised areas 22 are not provided, vacuum within the rotating collection surface 14 may be varied to create zones of vacuum 34 and zones free of vacuum or with less vacuum 36. The filaments may be drawn more to the zones of vacuum 34 than to the zones free of vacuum or with less vacuum 36. As a result, portions of a web formed in the zones of vacuum 34 may have higher intensive properties than portions of the web formed in the zones free of vacuum or with less vacuum 36. The intensive property may be basis weight, volumetric density, caliper, air permeability, and/or opacity.

If the raised areas 22 are provided on the outer surface 32, the zones of vacuum 36 and the zones free of vacuum or with less vacuum 36 mayor may not be provided. In such an instance where the zones 34/36 are not provided, the vacuum force applied to filaments may be blocked in areas under the raised areas 22. This may cause filaments to concentrate where vacuum is provided i.e., in between the raised areas 22. As such, the portions of the web formed in between the raised areas 22 may have a higher intensive property compared to the portions of the web formed on the raised areas 22. It is possible to provide vacuum through the raised areas 22 in some instances, although that vacuum may typically be provided at a strength that is less than the vacuum provided between the raised areas 22 to achieve greater filament concentration in between the raised areas 22. Height differences between the land areas 18 and the raised areas 22 may be in the range of about 0.1 mm to about 15 mm, about 0.2 mm to about 10 mm, about 0.2 mm to about 5 mm, about 0.3 mm to about 3 mm, about 0.3 mm to about 2 mm, greater than about 0.3 mm, greater than about 0.5 mm, or greater than about 0.8 mm. Having these height differentials between the land areas 18 and the raised areas 22 enables sufficient three-dimensional feature formation that is visually appealing in a final three-dimensional web.

Figure 12:
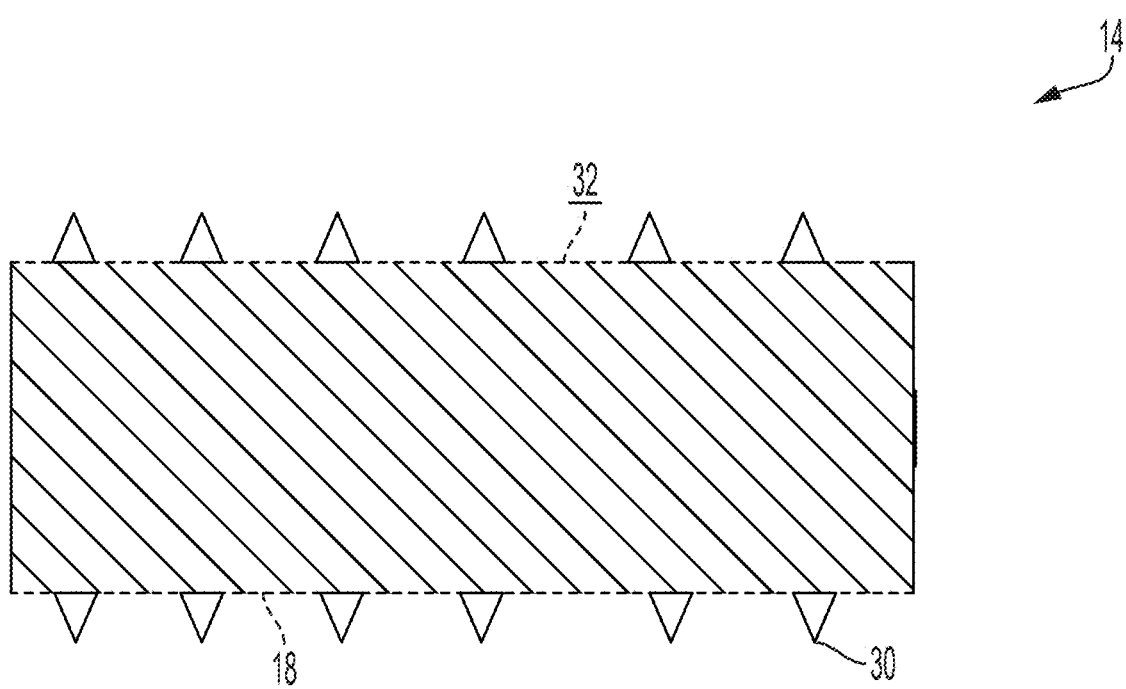

FIG. 12 illustrates a rotating collection surface 14 with a fluid permeable outer surface 32. Pins 30 extend outwardly from the fluid permeable outer surface 32. The vacuum force applied to filaments may be blocked in areas under the pins 30. This may cause filaments to concentrate where vacuum is provided i.e., in between the pins 30. As such, the portions of the web formed in between the pins 30 may have a higher intensive property compared to the portions of the web formed on the pins 30. It is possible to provide vacuum through the pins 30 in some instances, although that vacuum may typically be provided at a strength that is less than the vacuum provided between the pins 30 to achieve greater filament concentration in between the pins 30. In some instances, the pins 30 may be used to create apertures in the web. Height differences between the land areas 18 and the pins 30 may be in the range of about 0.1 mm to about 15 mm, about 0.2 mm to about 10 mm, about 0.2 mm to about 5 mm, about 0.3 mm to about 3 mm, about 0.3 mm to about 2 mm, greater than about 0.3 mm, greater than about 0.5 mm, or greater than about 0.8 mm. Having these height differentials between the land areas 18 and the pins 30 enables sufficient three-dimensional feature formation that is visually appealing in a three-dimensional final web.

Any of the land areas, pins, raised areas and/or cavities discussed herein may have a length or width in at least one dimension in the range of about 0.1 mm to about 15 mm, about 0.1 mm to about 10 mm, about 0.3 mm to about 10 mm, about 0.5 mm to about 8 mm, about 0.8 mm to about 5 mm, about 0.8 mm to about 3 mm, about 0.8 to about 2 mm, or about 0.8 to about 1.2 mm, for example. This allows for sufficient three-dimensionality to be created in final three-dimensional webs owing to the land areas, pins, raised areas, and/or cavities.

Figure 13:
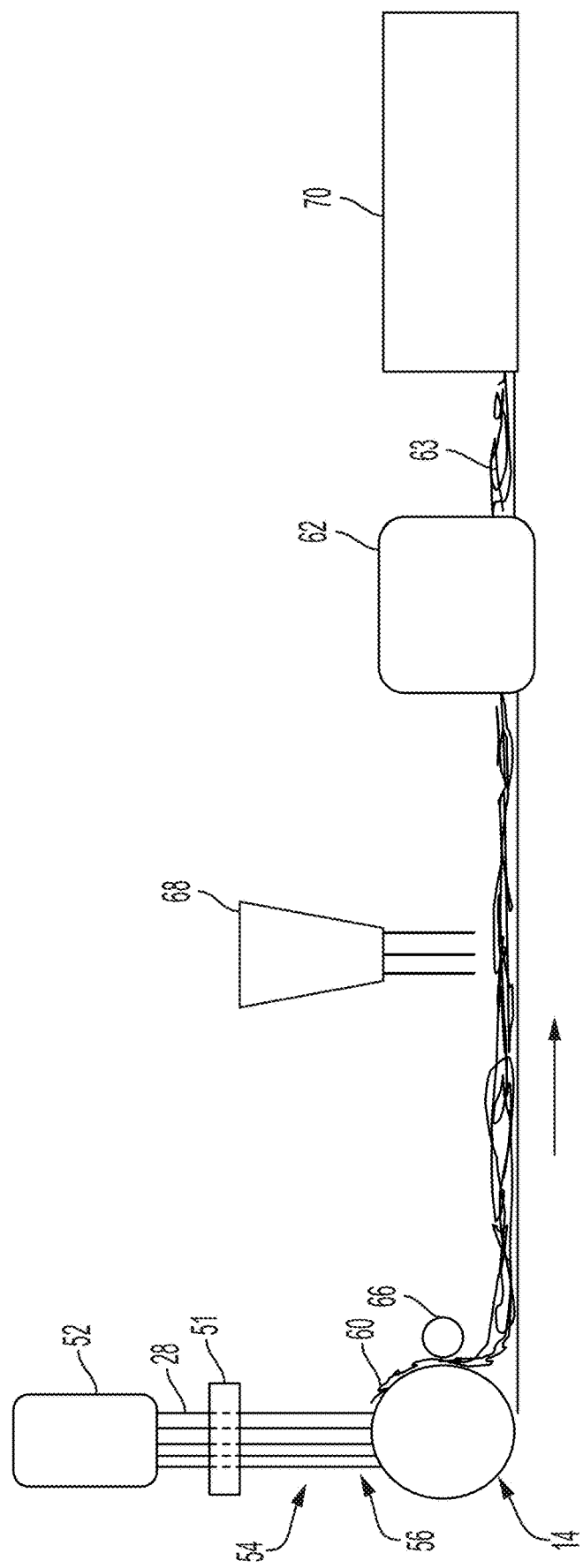
FIG. 13 is a schematic illustration of a method of making three-dimensional webs using a rotating collection surface of the present disclosure.

Referring to FIG. 13, a method of making a three-dimensional web is provided. The method may comprise spinning continuous filaments 28 from a spinneret 52 and moving or drawing the spun continuous filaments 28 along a travel path 54 having an end 56. The method may comprise rotating a collection surface 14 at or proximate to the end 56 of the travel path 54. The rotating collection surface 14 may comprise cavities 20 and land areas 18 (as illustrated in FIGS. 5-10). The land areas 18 may be tangentially planar with an outer surface of the collection surface 14. The cavities 20 may be recessed with respect to the outer surface of the rotating collection surface 14. The method may comprise applying a fluid pressure, such as vacuum, to the rotating collection surface 14. The fluid pressure may be applied in all areas of contact on the rotating collection surface between the rotating collection surface 14 and the filaments 28 or less than all areas of contact. The method may comprise collecting the filaments 28 on the collection surface 14 to create an intermediate three-dimensional web 60 having first regions formed in the cavities 20 and second regions formed on the land areas 18. The first regions and second regions may differ in at least one intensive property, wherein the intensive property is basis weight, volumetric density, caliper, air permeability, and/or opacity. The method may comprise bonding the intermediate three-dimensional web 60 using a bonding operation 62 to form a final three-dimensional web 63. Alternatively, the method may comprise conveying the intermediate three-dimensional web 60 through a bonding operation 62 to form a final three-dimensional web 63. The bonding operation 62 may comprise calendar bonding, ultrasonic bonding, air-through bonding, or combinations thereof. In the instance of an air-through bonding operation, the method may comprise creating filament to filament bonds in the intermediate three-dimensional web 60 to form the final three-dimensional web 63.

In some instances, the collection surface 14 may comprise raised areas 22 or pins 30 in the cavities 20 (FIG. 9) or in the land areas 18 (FIGS. 8 and 10). The raised areas 22 or pins 30 may have any suitable shape, such as forming pins, projections, and/or cylinders, for example. The raised areas 22 or pins 30 may be used to form apertures or projections (e.g., three-dimensional elements) in the intermediate three-dimensional web 60. The bottom portions of the cavities 20 may be fluid permeable, but substantially not, or not, filament 28 permeable. Portions of filaments 28 may be able to extend partially through the bottom portions 26 of the cavities 20, but for the most part, whole filaments 28 may not be able to move through the bottom portions 26. The method may comprise building up the filaments 28 in the cavities 20.

As the filaments 28 travel along the travel path 54, the method may comprise cooling and stretching the filaments 28. The filaments 28 may comprise mono-component fibers, bi-component fibers, or multi-component fibers. The bi-component fibers may comprise side-by-side fibers, core/sheath fibers, eccentric fibers, or islands-in-the-sea fibers, for example. The bi-components fibers may have a first component comprising a first material and a second component comprising a second, different material. The first material may have a first melting temperature and the second component may have a second melting temperature. The first melting temperature may be different than the second melting temperature by at least 10 degrees Celsius, but less than 180 degrees Celsius. This difference in melting temperatures causes the filaments to crimp since they cool at different rates. Crimping may help provide loft to the web.

As mentioned above, the rotating collection surface 14 may be a rotating member or drum that may or may not be circular. The rotating member or drum may have a textured, at least partially fluid permeable outer surface. In other instances, the rotating collection surface may be a rotating member or drum with a three-dimensional sleeve positioned over the rotating member or drum.

Referring again to FIG. 13, the method may comprise compacting the intermediate three-dimensional web 60 using one or more compaction rolls 66. The compaction roll 66 may form a nip with the rotating collection surface 14 through which the intermediate three-dimensional web may be conveyed. Downstream of the nip, or upon exiting the nip, the three-dimensional web may be removed from the rotating collection surface and conveyed onto a belt. The web may be removed from the rotating collection surface and conveyed onto a belt in the opposite direction as that illustrated in FIG. 13. Stated differently, the web may exit or be removed from the rotating collection surface and travel to the left in FIG. 13. The rotating collection surface may rotate in either direction and likewise the web may be conveyed to the left or the right. The compaction roll 66 may be positioned on one side of the rotating collection surface or the other based on which side the web is planned to travel over. The compaction roll 66 may have a smooth surface or may be textured to either compliment the texture on the rotating collection surface 14 or to form a male/female opposite of the rotating collection surface, as will be discussed in further detail below. The one or more compaction rolls 66 may be heated to a temperature in the range of about 50 degrees Celsius to about 200 degrees Celsius. The one or more compaction rolls 66 can provide a range of pressures to the web. In some instances, a hot air knife may be used instead of or in addition to the one or more compaction rolls 66 at the location of the compaction roll 66 and/or at other locations.

In other instances, it may be desirable to use a hot air knife 68 or other energy source downstream of the compaction roll 66 to apply hot air to the intermediate three-dimensional web 60 to at least partially bond the intermediate three-dimensional web 60. The hot air knife 68 may be positioned anywhere intermediate the rotating collection surface 14 and the bonding operation 62. The hot air knife or other energy source may also be positioned proximate to or directed at the rotating collection surface 14 to consolidate the web on the rotating collection surface 14. The hot air knife may provide hot air in the range of about 120 degrees Celsius to about 300 degrees Celsius or about 140 degrees Celsius to about 200 degrees Celsius, for example.

The method may comprise conveying the final three-dimensional web 63 into an absorbent article manufacturing line 70. In other instances, the method may be performed as part of an absorbent article manufacturing line. The method may comprise diffusing the filaments 28 along the travel path 54 using a diffuser 51. The final three-dimensional web 63 may not be or is not hydroentangled.

In any of the various forms described herein, it is possible to combine the formed webs with pre-bonded, or not pre-bonded webs to increase the basis weight of the webs or to form a laminate. This can be done on the same line that the webs are formed on, if desired.

A machine directional length of filament lay down on the rotating collection surfaces of the present disclosure may be less than 25%, less than 15%, less than 13%, but at least 2% or at least 5% of a circumference or outer surface perimeter of the rotating collection surfaces. A cross-directional width of filament lay down on the rotating collection surfaces of the present disclosure may be greater than 20 mm and less than 400 mm.

Figure 14:
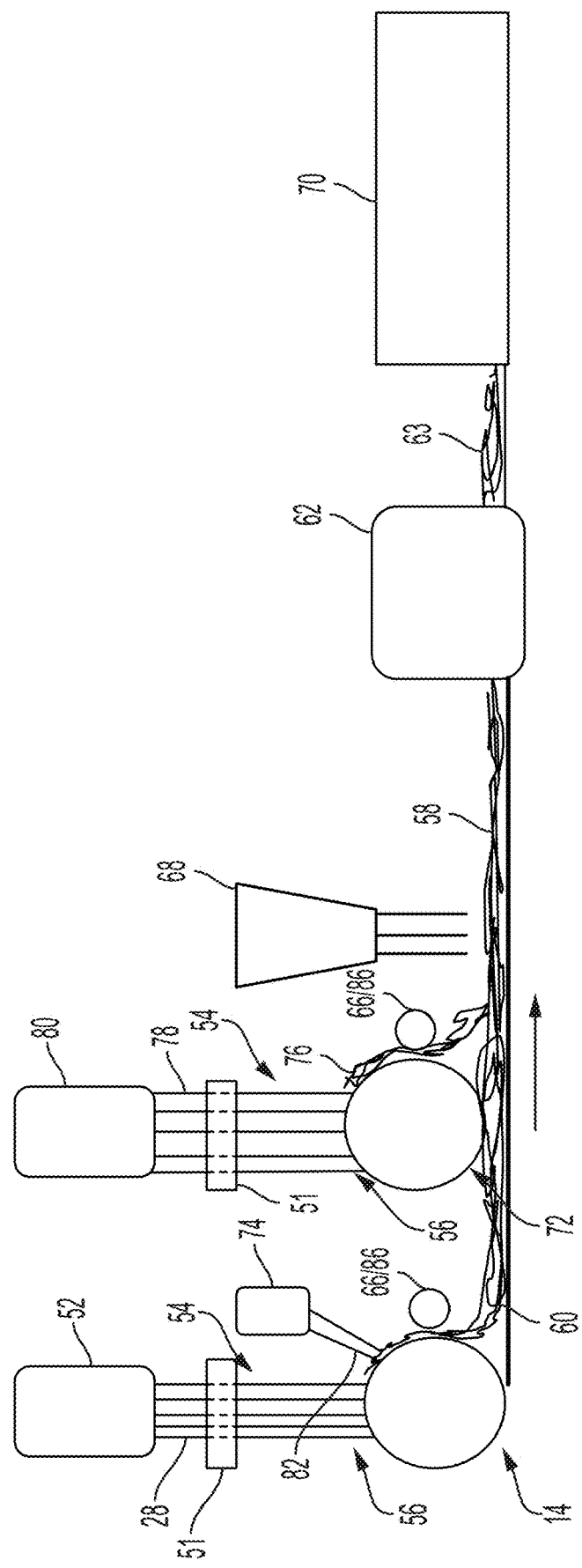
FIG. 14 is a schematic illustration of a method of making three-dimensional webs using more than one rotating collection surface of the present disclosure.

Referring to FIG. 14, the method may comprise additional steps, such as providing a second rotating collection surface 72 and providing a melt blown die or pulp source 74. Numbers in FIG. 14 that are the same as in FIG. 13 mean the element is the same or similar. The second rotating collection surface 72 may be the same as or similar to the rotating collection surface 14 or may merely be a non-textured collection surface. As such, the second rotating collection surface 72 may produce a web 76 with variable intensive properties, such as basis weight, like that described above with respect to collection surface 14 or the second rotating collection surface 72 may merely produce a web 76 without variable intensive properties to add basis weight to the intermediate three-dimensional web 60. If the second rotating collection surface 72 produces a web 76 with variable intensive properties, the web 76 mayor may not be registered with the intermediate three-dimensional web 60. The web 76 may be combined with the intermediate three-dimensional web 60 to form a laminate 58. The second rotating collection surface 72 may produce a web 76 having variable intensive properties that may be the same as or different than the variable intensive properties of the intermediate three-dimensional web 60 produced by the rotating collection surface 14. In such an instance, the web 60 may have the same or a different pattern as the web 76. This may be accomplished by having different texture on the rotating collection surface 14 compared to the second rotating collection surface 72, or using different textures sleeves on the rotating collection surfaces 14, 72. Any of the webs having variable intensive properties described herein may have one pattern or zone (e.g., a wall paper pattern) or more than one pattern or zone.

The method may comprise, subsequent to the collecting step and prior to the bonding step, spinning second continuous filaments 78 from a second spinneret 80, and collecting the second continuous filaments 78 on the intermediate three-dimensional web 60 to increase the basis weight of the intermediate three-dimensional web 60.

The method may comprise providing pulp, staple, and/or melt blown fibers 82 to the intermediate three-dimensional web 60. The pulp, staple, and/or melt blown fibers 82 may be provided to the rotating collection surface 14 and/or the second rotating collection surface 72 using a melt blown die or pulp source 74. As such, the intermediate three-dimensional web 60 may comprise pulp fibers, staple fibers, and/or melt blown fibers 82. Compaction rolls 66 may also be provided adjacent to the rotating collection surface 14 and/or the second rotating collection surface 72 to compact the web prior to the bonding operation 62.

The method of making a three-dimensional web may comprise spinning continuous filaments 28 from a spinneret 52 and moving the spun continuous filaments 28 along a travel path 56 having an end 56. The method may comprise rotating a collection surface 14 at or proximate to the end 56 of the travel path 54, wherein the collection surface 14 may comprise land areas 18 and raised areas 22 (see e.g., FIGS. 11 and 12), wherein the land areas 18 are tangentially planar with an outer surface 32 of the collection surface 14, wherein the raised areas 22 extend outwardly from the outer surface 32 of the collection surface 14, and wherein the land areas 18 have a higher fluid permeability than the raised areas 22. The method may comprise applying a fluid pressure, such as vacuum, to the collection surface 14. The method may comprise collecting the filaments 28 on the collection surface 14 to create an intermediate three-dimensional web 60 having first regions formed on the land areas 18 and second regions formed on the raised areas 22, wherein the first regions and second regions may differ in at least one intensive property. The intensive property may be basis weight, volumetric density, caliper, air permeability, and/or opacity. The method may comprise bonding the intermediate three-dimensional web 60 using a bonding operation 62 to form a final three-dimensional web 63. Alternatively, the method may comprise conveying the intermediate three-dimensional web 60 through a bonding operation 62 to form a final three-dimensional web 63.

The method may comprise providing cavities 20 recessed with respect to the outer surface 32 of the collection surface 14, wherein bottom portions 26 of the cavities 20 are fluid permeable, but substantially not filament 20 permeable. The raised areas 22 may be continuous and the land areas 18 may be discrete. Alternatively the land areas 18 may be continuous and the raised areas 22 may be discrete.

The bonding operation 62 may comprise through air bonding, calendar bonding, ultrasonic bonding, or other suitable bonding, such as mechanical bonding.

The collection surface 14 may comprise a three-dimensional sleeve 10 positioned over a rotating member or drum 12. The method may be performed on an absorbent article manufacturing line 70 or the final three-dimensional web 63 may be conveyed into an absorbent article manufacturing line 70.

Figure 15:
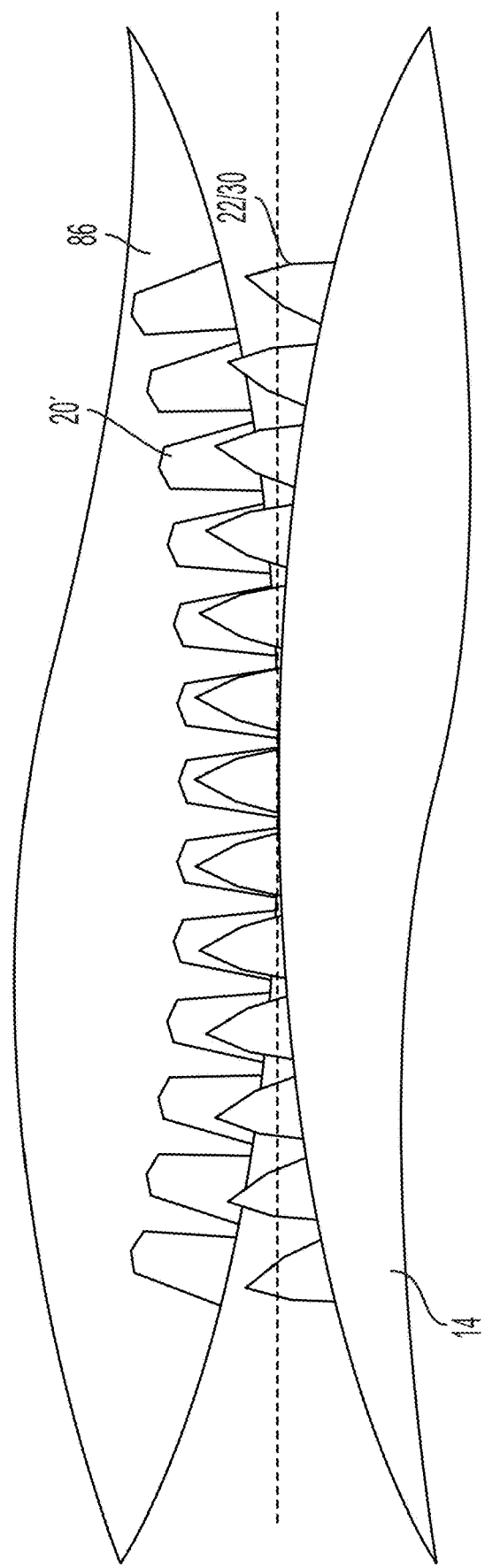
FIG. 15 is an example of an auxiliary roll engaged with a portion of a rotating collection surface of the present disclosure.
Figure 16:
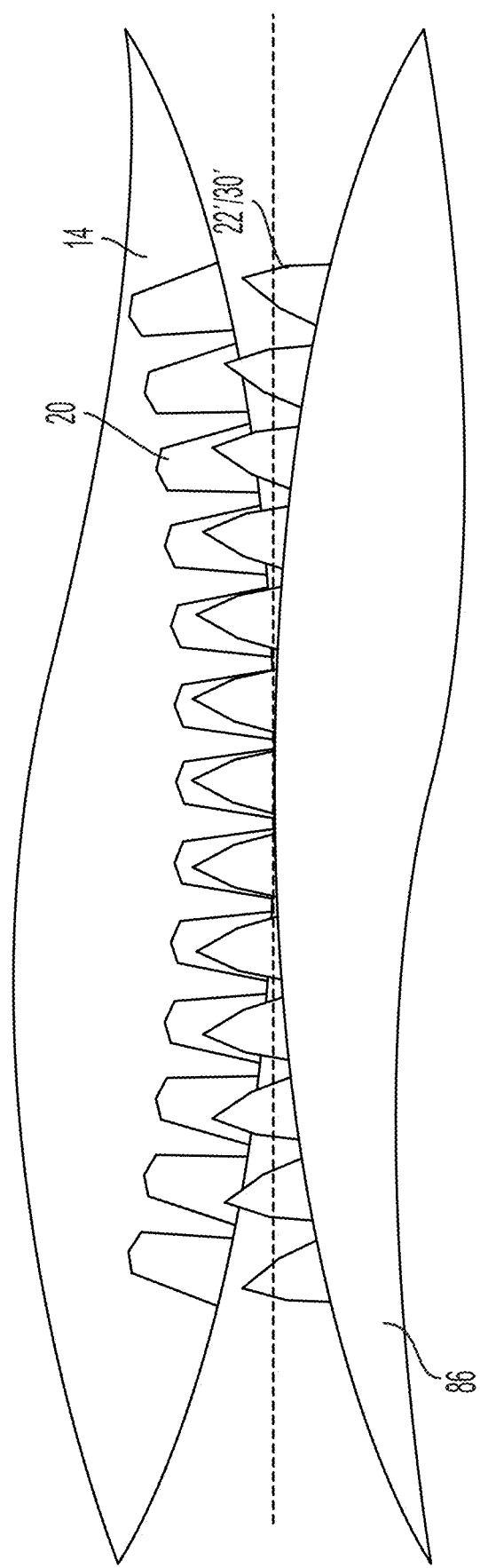
FIG. 16 is an example of an auxiliary roll engaged with a portion of a rotating collection surface of the present disclosure.

Instead of or in addition to using the compaction roll 66, an auxiliary roll 86 may be positioned where the compaction roll 66 is illustrated in FIG. 14. FIG. 15 an example of an auxiliary roll 86 engaged with a portion of a rotating collection surface 14 of the present disclosure. FIG. 16 is an example of an auxiliary roll 86 engaged with a portion of a rotating collection surface 14 of the present disclosure. FIG. 15 illustrates the rotating collection surface 14 having raised areas 22 or pins 30 and the auxiliary roll having cavities 20'. The method may comprise providing an auxiliary roll 86 adjacent to the rotating collection surface 14, wherein the auxiliary roll comprises cavities 20'. The method may comprise rotating the auxiliary roll 86 with the rotating collection surface 14 and engaging the raised areas 22 or pins 30 of the rotating collection surface 14 into the cavities 20' of the auxiliary roll 86. This will allow for clear aperture formation because of: (1) higher basis weight areas being formed on the rotating collection surface 14 in areas free of the raised areas 22 or pins 30, leaving lower basis weight areas or partially formed apertures on the raised areas 22 or pins 30 (see e.g., FIGS. 12) and (2) mechanical female/male engagement of the web to further create or to create apertures.

FIG. 16 illustrates the rotating collection surface 14 having cavities 20 and the auxiliary roll 86 having raised areas 22' or pins 30'. The method may comprise providing an auxiliary roll 86 adjacent to the rotating collection surface 14, wherein the auxiliary roll has raised areas 22' or pins 30'. The method may comprise rotating the auxiliary roll 86 with the rotating collection surface 14 and engaging the raised areas 22' or pins 30' of the auxiliary roll 86 into the cavities 20 of the rotating collection surface 14 to create projections or apertures. This will allow for clear aperture formation because of: (1) higher basis weight areas being formed on the rotating collection surface 14 in areas free of the raised areas 22 or pins 30, leaving lower basis weight areas or partially formed apertures on the raised areas 22 or pins 30 (see e.g., FIGS. 12) and (2) mechanical female/male engagement of the web to further create or to create apertures.

The method may comprise a web release step or web blow-off step. For example, a fluid pressure may contact the web downstream of the lay down location on the rotating collection surface to at least partially, or fully, release the web from the rotating collection surface. This can be accomplished by providing a fluid pressure directed outwardly from inside the rotating collection surface. This can also be accomplished by using vacuum, such as a vacuum roller to essentially suck the web from the rotating collection surface. In some instances, a fluid pressure directly outwardly from inside the rotating collection surface may be used in conjunction with vacuum to achieve suitable web release from the rotating collection surface. Owing to the intricate pattern of three-dimensional features created by the methods disclosed herein, web release may be a suitable step to achieve adequate web formation. As an example, the web release step may occur downstream of the compaction roll or auxiliary roll during rotation of the rotating collection surface.

In addition to using the fluid pressure directed outwardly from inside the rotating collection surface and/or vacuum for web release, the same or a similar process may be used to clean the rotating collection surface. In view of the intricate patterns formed by the rotating collection surfaces, some filaments, or portions thereof, may become caught or entangled in the permeable, or other, areas of the rotating collection surfaces. To achieve suitable run times, cleaning the rotating collection surface may be an important step. As an example, the cleaning step may occur downstream of the compaction roll or auxiliary roll during rotation of the rotating collection surface.

The rotating collection surfaces of the present disclosure may be used to generate nonwoven fabrics or three-dimensional webs comprising a first surface and a second surface and a visually discernible pattern of three-dimensional features on one of the first or second surface. Each of the three-dimensional features may define a microzone comprising a first region and a second region. The first and second regions may have a difference in values for an intensive property, wherein the intensive property may be one, two, or all three of caliper, basis weight, and volumetric density. Such nonwovens fabrics are described in PCT publication WO 2017/105997, U.S. Pat. App. Pub. No. US 2018/0168893, U.S. Pat. App. Pub. No. US 2018/0216271, U.S. Pat. App. Pub. No. US 2018/0214318, U.S. Pat. Appl. Pub. No. US 2020/0268572, U.S. Pat. App. Pub. No. US 2020/0299880, and U.S. Pat. App. Pub. No. US 2021/0369511.

The rotating collection surfaces of the present disclosure may have dimensions as follows. Land areas 18 with lower (or no) fluid permeability may have a major dimension (in any direction) that is between about 0.1 mm and about 100 mm. The more fluid permeable cavities 20 may have openings (to have fluid permeability) with a major dimension in the range of about 0.1 mm to about 4 mm or between about 0.2 mm and about 1.5 mm (e.g., in case of circular openings the diameter may be between about 0.1 mm and about 4 mm or between about 0.2 mm and about 1.5 mm). The major dimension of the cavities 20 may be between about 0.1 mm and about 100 mm in any direction. The rotating collection surface or three-dimensional sleeve may have a fluid permeable area in the range of about 5% to about 95%, about 20% to about 80%, or about 40% to about 70%, of the total rotating collection surface, surface area or total three-dimensional sleeve, surface area. These selected fluid permeable area ranges are selected to ensure there is sufficient preferential fluid flow between different regions enabling different filament movements into different regions. For a 10 to 40 micron average filament diameter spun filaments (alternatively 0.7 to 6 denier filaments), at least one of the dimension for cavities may be >1 mm, or >2, or >3 mm. That dimension should be in the direction of movement in the machine direction. The spinneret may spin at least about 15 filaments per cm and may spin at least about 30 filaments per beam. The machine direction width of the beam should be at least 15 mm and may be in the range of about 25 mm to about 60 mm. The total basis weight of the web may be at least 12 gsm up to about 150 gsm or 100 gsm. The above design criteria may ensure there is sufficient resolution during web manufacturing to achieve high quality definition and uniform structures in the formed webs.

In case of a circular rotating collection surface or three-dimensional sleeve, the diameter may be about 300 mm to about 10 meters. In case of a non-circular rotating collection surface or three-dimensional sleeve, a circumference may be in the range of about 1 meter to about 100 meters.

The filaments may comprise any suitable compositions and may be monocomponent filaments or bicomponent filaments. Example polymers may comprise polypropylene, polyethylene, polar solvent-soluble materials, non-polar solvent-soluble materials, polyvinyl alcohol, water-soluble starch, water soluble hydroxyl polymers, polysaccharides, or combinations thereof. The filaments may also comprise recycled and/or bio-based materials. The filaments may also comprise pulp.

The filaments may comprise any suitable compositions and may be monocomponent filaments or bicomponent filaments. Example polymers for the filaments may comprise polypropylene, polyethylene, polyolefins, polyesters, PLA, polar solvent-soluble materials, non-polar solvent-soluble materials, polyvinyl alcohol, water-soluble starches, water soluble hydroxyl polymers, polysaccharides, cellulose, cellulose derivatives, or combinations thereof. The filaments may also comprise recycled and/or bio-based materials. Example polymer materials may also comprise those described in U.S. Pat. Appl. Pub. No. US2013/0171421, U.S. Pat. Appl. Pub. No. 2012/0052037, and U.S. Pat. Appl. Pub. No. 2015/0071572. Further example polymer materials comprising cellulose or cellulose derivatives may comprise those described in U.S. Pat. Appl. Pub. No. US 2023/0098304 and U.S. Pat. No. 11,326,283. The bicomponent filaments may be crimped. The crimping may occur in bicomponent fibers by a first component cooling at a different rate than a second component.

The three-dimensional webs formed using the methods described herein may also comprise blends of filaments, individualized fibers, and/or particles or so called coform webs. Individualized fibers, for example, comprise wood pulp fiber, cellulose fiber, cellulose fiber derivative fibers, staple fiber, plant based fibers, bamboo fibers, and combinations thereof. Example three dimensional webs comprising filaments and particles comprise those described in U.S. Pat. Appl. Pub. No. 2013 0172226, U.S. Pat. Appl. Pub. No. 2009/0233072, U.S. Pat. Appl. Pub. No. 2015/0071572, U.S. Pat. Appl. Pub. No. 2017/0165720, WO2020/147227, WO2020/147228, WO2020/147229, WO2020/147230, WO2020/147231, WO2020/147232, U.S. Pat. Nos. 8,017,534, 8,852,474, 10,513,801, 11,326,276, and U.S. Pat. Appl. Pub. No. 2022/0325440.

In some instances, two spinnerets may deposit filaments onto a single rotating collection surface at different locations on the single rotating collection surface. This may eliminate or reduce the need for registration between two three-dimensional webs produced on different rotating collection surfaces. This may also add increased throughput and line speeds resulting in lower cost materials. Having two spinnerets deposit filaments onto a single rotating collection surface at different locations on the single rotating collection surface may deliver improved three-dimensional patterning compared to having two separate rotating collection surfaces with one spinneret depositing filaments onto each one.

Figure 17:
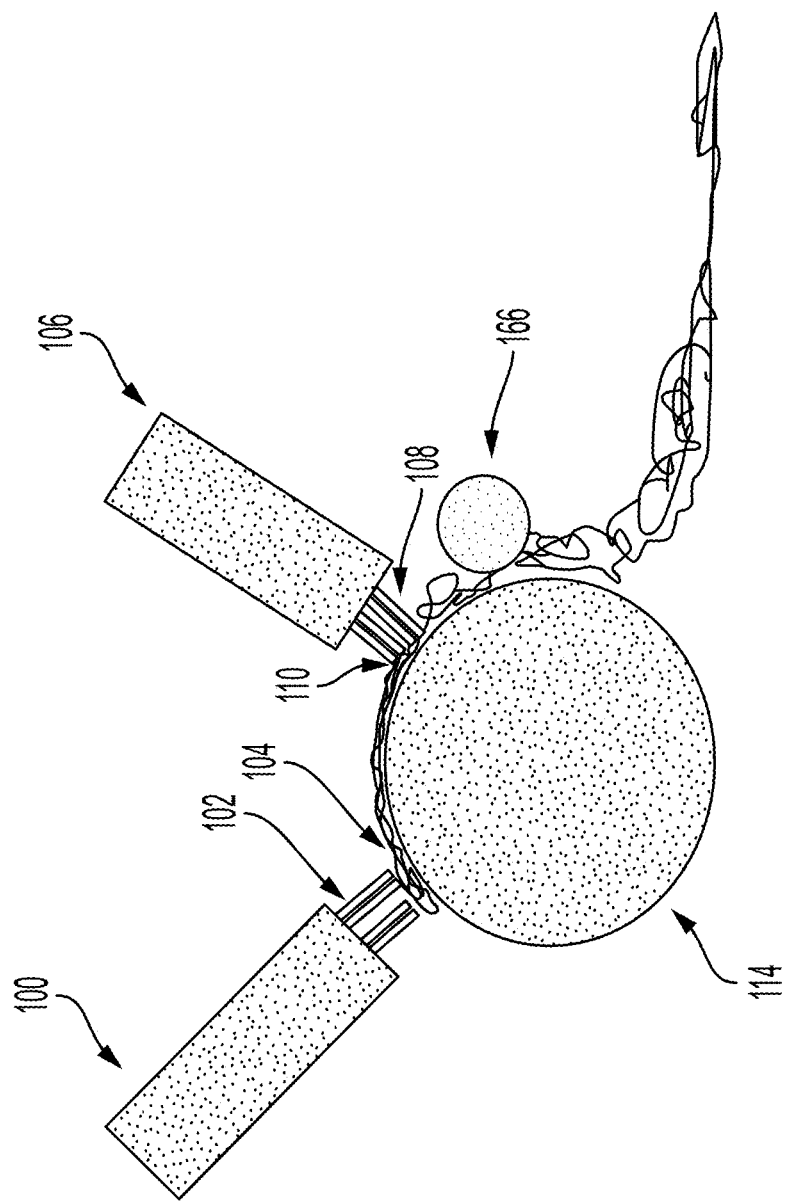
FIG. 17 is a schematic illustration of two spinnerets depositing filaments onto a single rotating collection surface.

Referring to FIG. 17, a first spinneret 100 may deposit first filaments 102 onto a single rotating collection surface 114 at a first location 104 and a second spinneret 106 may deposit second filaments 108 onto the single rotating collection surface 114 at a second, different location 110. The second filaments 108 may be deposited onto the first filaments 102. A compaction roll 166 may also be provided similar to the compaction roll 66 described herein. Alternatively, an auxiliary roll may be provided similar to the auxiliary roll 86 described herein. The remainder of web creation process may be similar to that described herein.

Figure 18:
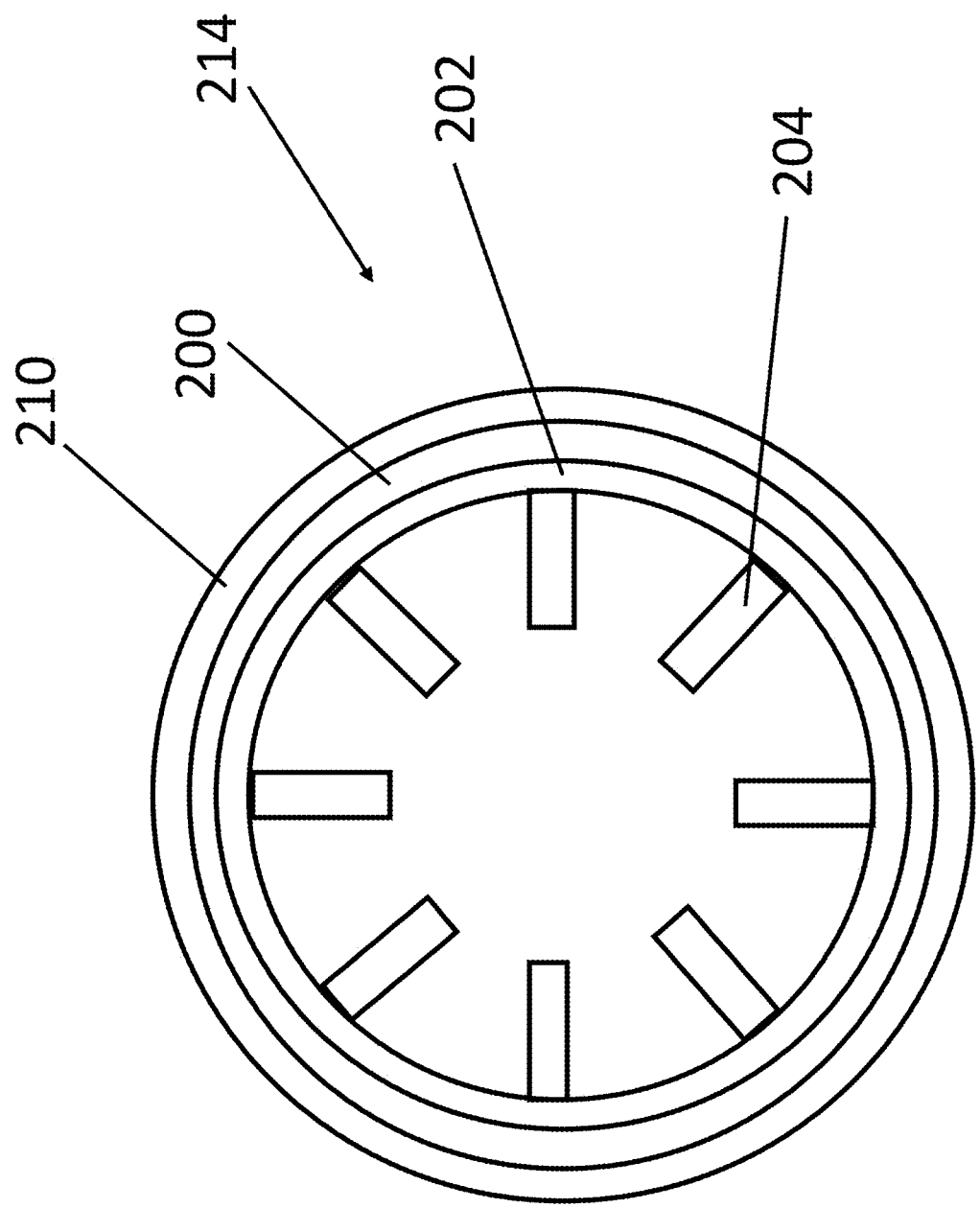
FIG. 18 is a schematic example of a rotating collection surface with a support screen and a porous member.

Referring to FIG. 18, a schematic example of a rotating collection surface 214 is illustrated. The rotating collection surface 214 comprises an outer three-dimensional sleeve 210, a porous member 200, and a support screen 202. The support screen 202 may provide structural integrity to the three-dimensional sleeve 10, for instance when the compaction roll 66 or auxiliary roll 86 is used and exerts a force until the three-dimensional sleeve 210. The support screen 202 typically has a large open area such as in the range of about 25% to about 60% and may have a thickness in the range of about 0.2 mm to about 6 mm, for example. Owing to the fact that the open area of the support screen is not typically 75-95%, for example, the porous member 200 may be provided intermediate the three-dimensional sleeve 210 and the support screen 202 to provide even fluid pressure to the three-dimensional sleeve 210. The porous member 200 may also provide a gap between the three-dimensional sleeve 210 and the support screen 202 to again provide even fluid pressure to the three-dimensional sleeve 210. Fluid conduits 204 may provide a fluid pressure to the support screen 202 and ultimately to the three-dimensional sleeve 210. Any of the fluid conduits 204 may be turned on or off or have increased fluid flow or decreased fluid flow. In an example, the fluid conduits 204 may be turned on when a portion of the web is present over that portion of the three-dimensional sleeve 210. In another example, more fluid pressure may be provided to the three-dimensional sleeve 210 in the filament lay down area. As mentioned herein, the fluid conduits 204 may be configured to deliver a positive and/or a negative fluid pressure. The negative fluid pressure may be used to pull the filaments and/or the web into the three-dimensional screen 210, while the positive fluid pressure may be used to release the web from the rotating collection surface 210 or may be used to expel partial or full filaments caught or entangled in the three-dimensional sleeve to clean the three-dimensional sleeve.

Referring to FIG. 19, a schematic example of another rotating collection surface 314 is illustrated. The rotating collection surface 314 is the same as the rotating collection surface 214 of FIG. 18 except a porous member may not be provided. The rotating collection surface 314 may comprise a three-dimensional sleeve 310, a support member 302 and fluid conduits 304.

The various support screens may have an air permeability in the range of about 45 $m^3/m^2$/min to about 400 $m^3/m^2$/min, about 60 $m^3/m^2$/min to about 350 $m^3/m^2$/min, or about 75 $m^3/m^2$/min to about 300 $m^3/m^2$/min. The support screens of the present disclosure may have a circular pattern of cut out material to achieve fluid permeability. Other shapes of cut out material may also be used, such as ovals, elongate shape, and/or slots, for example.

The porous member may have an air permeability in the range of about 45 $m^3/m^2$/min to about 400 $m^3/m^2$/min, about 60 $m^3/m^2$/min to about 350 $m^3/m^2$/min, or about 75 $m^3/m^2$/min to about 300 $m^3/m^2$/min.

The three-dimensional sleeve may comprise polymeric materials, such as polyoxymethylene, for example, or may comprise metallic materials, such as steel, nickel, and/or brass, for example. Other suitable materials may also be used.

The porous member may comprise metallic materials, such as steel, for example, or polymeric materials. Other suitable materials may also be used.

The support screen may comprise metallic materials, such as steel, for example. Other suitable materials may also be used.

The methods discussed herein may produce webs at a rate of about 40 meters/minute to about 300 meters/minute for a single spinneret. The methods discussed herein may produce webs at a rate of about 80 meters/minute to about 600 meters/minute for two spinnerets. The methods discussed herein may produce webs at a rate of about 120 meters/minute to about 1200 meters/minute for three spinnerets.

Surface Topography

The rotating collection surfaces disclosed herein may have a certain surface texture, Sa (arithmetical mean height) in the land areas, on surfaces of the raised areas, projections, or pins, and/or on bottoms and/or side walls of the cavities. A certain range of surface texture, Sa, in the land areas, on surfaces of the raised areas, projections, or pins, and/or on bottoms and/or side walls of the cavities is helpful in enabling filaments to release from the rotating collection surface after web formation. In an example, the certain surface texture may be present anywhere filaments touch the rotating collection surface. Surface texture, Sa, may be in the range of about 10 μm to about 220 μm, about 10 μm to about 200 μm, about 10 μm to about 150 μm, about 10 μm to about 100 μm, or about 15 μm to about 100 um, for example. Surface texture, Sa, is measured using the Surface Topography Test Method herein. In an example, surface texture, Sa, may be in the range of about 10 μm to about 220 μm, about 10 μm to about 200 μm, about 10 μm to about 150 μm, about 10 μm to about 100 μm, or about 15 μm to about 100 um, for example, in the land areas. Surface texture, Sa, is measured using the Surface Topography Test Method herein.

Surface Topography Test Method

In the Surface Topography Test the areal surface topology of a sample surface is measured using optical profilometry. The three-dimensional (3D) surface data are then processed and analyzed to extract the microscale areal surface texture parameter Sa (arithmetical mean height). Sa is the average value of the absolute value of height each point in the defined area.

3D surface topography images of the belts are obtained using high-intensity, LEDs in projection units on the Keyence VR-6000/6200 3D Optical Profilometer. The system includes the following main components: a) a controller (VR-6000) which houses the high-intensity LED light source used for observation, control circuit boards, and other hardware, and b) the head which is the unit that includes the high-intensity LED light source for measurement, the CMOS camera, the scan optics, and the telecentric lens. Fringe projection light passes through the telecentric projection lens and impinges on the object diagonally from above. When there are height differences on the object surface and when light is applied to the object diagonally, the fringe projection image becomes distorted. The VR-6000 Series captures the distorted fringe projection image from straight above with the camera and measures the object height from the distortion.

The samples were placed flat on the motorized stage beneath the camera in ambient conditions. Weights were placed on the sample outside of the measurement area to remove large scale waviness in the sample. Four images were stitched together to form a 3D surface topology image (~30 mm×40 mm) of the sample surface. Images were pre-processed before measurements following the instrument manufacturer's recommended procedures to correct for surface shape and noise. Regions of interest comprising the three-dimensional features of the rotating collection surfaces of the present disclosure within the filtered height images were used to measure Sa in accordance with ISO 25178-2:2012.

EXAMPLES/COMBINATIONS

1. A method of making a three-dimensional web, comprising:
spinning continuous filaments from a spinneret;
moving the spun continuous filaments along a travel path having an end;
rotating a collection surface at or proximate to the end of the travel path, wherein the collection surface comprises land areas and raised areas, wherein the land areas are tangentially planar with an outer surface of the collection surface, wherein the raised areas extend outwardly from the outer surface of the collection surface, and wherein the land areas have a higher fluid permeability than the raised areas;
applying a fluid pressure to the collection surface;
collecting the filaments on the collection surface to create an intermediate three-dimensional web having first regions formed on the land areas and second regions formed on the raised areas, wherein the first regions and second regions differ in at least one intensive property; and
bonding the intermediate three-dimensional web using a bonding operation to form a final three-dimensional web.

2. The method of Paragraph 1, comprising providing cavities recessed with respect to the outer surface of the collection surface, and creating a fluid pressure at bottoms of the cavities that are fluid permeable, but substantially not filament permeable.

3. The method of Paragraph 1 or 2, wherein the raised areas are continuous, and wherein the land areas are discrete.

4. The method of Paragraph 1 or 2, wherein the land areas are continuous, and wherein the raised areas are discrete.

5. The method of any one of Paragraphs 1-4, wherein the bonding operation comprises through air bonding, calendar bonding, ultrasonic bonding, or combinations thereof.

6. The method of any one of Paragraphs 1-5, wherein the collection surface comprises a three-dimensional sleeve positioned over a rotating member.

7. The method of any one of Paragraphs 1-6, wherein the method is performed on an absorbent article manufacturing line.

8. The method of any one of Paragraphs 1-7, comprising:
providing an auxiliary roll adjacent to the rotating collection surface, wherein the auxiliary roll comprises cavities;
rotating the auxiliary roll with the rotating collection surface; and
engaging the raised areas of the rotating collection surface into the cavities of the auxiliary roll.

9. The method of Paragraph 2, comprising:
providing an auxiliary roll adjacent to the rotating collection surface, wherein the auxiliary roll has raised areas;
rotating the auxiliary roll with the rotating collection surface;
engaging the second raised areas of the auxiliary roll into the cavities of the rotating collection surface to create projections or apertures.

10. The method of Paragraph 1, comprising forming apertures in the intermediate three-dimensional web using the raised areas.

11. The method of any one of Paragraphs 1-10, wherein the filaments comprise polypropylene, polyethylene, polyesters, PLA, polar solvent-soluble materials, non-polar solvent-soluble materials, polyvinyl alcohol, water-soluble starches, water soluble hydroxyl polymers, polysaccharides, or combinations thereof.

12. The method of any one of Paragraphs 1-11, wherein the three dimensional web comprises the filaments, individualized fibers, and/or particles.

13. The method of any one of Paragraphs 1-12, wherein the land areas of a portion of the rotating collection surface have a surface texture, Sa, in the range of about 10 μm to about 220 μm, according to the Surface Topography Test Method.

14. A method of making a three-dimensional web, comprising:
spinning first continuous filaments from a first spinneret;
moving the spun first continuous filaments along a first travel path having a first end;
spinning second continuous filaments from a second spinneret;
moving the spun second continuous filaments along a second travel path having a second end;
rotating a single collection surface at or proximate to the first end of the first travel path and at or proximate to the second end of the second travel path, wherein the collection surface comprises cavities and land areas, wherein the land areas are tangentially planar with an outer surface of the collection surface, and wherein the cavities are recessed with respect to the outer surface of the collection surface; and
applying a fluid pressure to the collection surface; and
collecting the first and second filaments on the collection surface to create an intermediate three-dimensional web having first regions formed in the cavities and second regions formed on the land areas, wherein the first regions and second regions differ in at least one intensive property, and wherein values of the intensive property in the first regions and the second regions are both greater than zero; and
bonding the intermediate three-dimensional web using a bonding operation to form a final three-dimensional web.

15. The method of Paragraph 14, wherein the collection step comprises collecting the second filaments on the first filaments.

16. The method of Paragraph 14, wherein the first end of the first travel path is at a different location on the single rotating collection surface than the second end of the second travel path.

17. The method of any one of Paragraphs 14-16, wherein the land areas of a portion of the single rotating collection surface have a surface texture, Sa, in the range of about 10 μm to about 220 μm, according to the Surface Topography Test Method.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any embodiment disclosed or claimed herein or that it alone, or in any combination with any other reference or references, teaches, suggests or discloses any such embodiment. Further, to the extent that any meaning or definition of a term in this document conflicts with any meaning or definition of the same term in a document incorporated by reference, the meaning or definition assigned to that term in this document shall govern.

While particular embodiments of the present disclosure have been illustrated and described, it would be obvious to those skilled in the art that various other changes and modifications may be made without departing from the spirit and scope of the present disclosure. It is therefore intended to cover in the appended claims all such changes and modifications that are within the scope of this disclosure.

What is claimed is:

1. A method of making a three-dimensional web, comprising:
providing a collection surface that does not have photo-curable resin;
spinning continuous filaments from a spinneret;
moving the spun continuous filaments along a travel path having an end;
rotating the collection surface at or proximate to the end of the travel path, wherein the collection surface comprises cavities and land areas, wherein the land areas are tangentially planar with an outer surface of the collection surface, and wherein the cavities are recessed with respect to the outer surface of the collection surface;
applying a fluid pressure to the collection surface;
collecting the filaments on the collection surface to create an intermediate three-dimensional web having first regions formed in the cavities and second regions formed on the land areas, wherein the first regions and second regions differ in at least one intensive property, and wherein values of the intensive property in the first regions and the second regions are both greater than zero; and
bonding the intermediate three-dimensional web using a bonding operation to form a final three-dimensional web.

2. The method of claim 1, wherein the collection surface comprises raised areas that extend outwardly from the outer surface of the collection surface.

3. The method of claim 2, comprising forming apertures in the intermediate three-dimensional web using the raised areas.

4. The method of claim 2, comprising forming projections in the intermediate three-dimensional web using the raised areas.

5. The method of claim 1, comprising creating a fluid pressure at bottom portions of the cavities that are fluid permeable, but substantially not filament permeable, and comprising building up the filaments in the cavities.

6. The method of claim 1, comprising, along the travel path, cooling and stretching the filaments.

7. The method of claim 1, wherein the continuous filaments comprise bicomponent continuous filaments having a first component and a second component.

8. The method of claim 7, wherein the bicomponent filaments are side-by-side bicomponent filaments or eccentric bicomponent filaments.

9. The method of claim 7, wherein the first component has a different melting temperature than the second component.

10. The method of claim 1, wherein the collection surface is a rotating drum and is not a belt.

11. The method of claim 1, wherein the collection surface comprises a three-dimensional sleeve positioned over a rotating member, wherein the three-dimensional sleeve is not a belt.

12. The method of claim 1, comprising air-through bonding the intermediate three-dimensional web to create filament to filament bonds in the web and form the final three-dimensional web.

13. The method of claim 1, comprising compacting the intermediate three-dimensional web on the collection surface using a compaction roll, wherein a nip is formed intermediate the compaction roll and the collection surface, and wherein the intermediate three-dimensional web is removed from the collection surface downstream of or upon exiting the nip.

14. The method of claim 1, comprising applying hot air to the intermediate three-dimensional web to at least partially bond the intermediate three-dimensional web.

15. The method of claim 1, comprising combining a second web with the intermediate three-dimensional web to form a laminate.

16. The method of claim 1, comprising, subsequent to the collecting step and prior to the bonding step, spinning second continuous filaments from a second spinneret, and collecting the second continuous filaments on the intermediate three-dimensional web to increase the basis weight of the intermediate three-dimensional web.

17. The method of claim 1, comprising, subsequent to the collecting step and prior to the bonding step, spinning second continuous filaments from a second spinneret onto a second collection surface, and conveying the second continuous filaments onto the intermediate three-dimensional web to increase the basis weight of the intermediate three-dimensional web.

18. The method of claim 1, comprising conveying the final three-dimensional web into an absorbent article manufacturing line.

19. The method of claim 1, wherein the intensive property is basis weight, caliper, or volumetric density.

20. The method of claim 1, wherein the intensive property is air permeability or opacity.

21. The method of claim 1, wherein the web comprises pulp fibers, or wherein the web comprises staple fibers.

22. The method of claim 1, wherein the bonding operation comprises calendar bonding, ultrasonic bonding, or combinations thereof.

23. The method of claim 1, wherein the final three-dimensional web is not hydroentangled.

24. The method of claim 1, wherein the cavities have a higher fluid permeability than the land areas.

25. The method of claim 1, wherein the method is performed on an absorbent article manufacturing line.

26. The method of claim 1, wherein the land areas of a portion of the rotating collection surface have a surface texture, Sa, in the range of about 10 μm to about 220 μm, according to the Surface Topography Test Method.

* * * * *